US011573087B1

United States Patent
Ito et al.

(10) Patent No.: US 11,573,087 B1
(45) Date of Patent: Feb. 7, 2023

(54) BOAT MANEUVERING CONTROL METHOD FOR BOAT AND BOAT MANEUVERING CONTROL SYSTEM FOR BOAT

(71) Applicant: YAMAHA HATSUDOKI KABUSHIKI KAISHA, Iwata (JP)

(72) Inventors: Makoto Ito, Shizuoka (JP); Kohei Yamaguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 404 days.

(21) Appl. No.: 16/886,831

(22) Filed: May 29, 2020

Related U.S. Application Data

(60) Provisional application No. 62/854,438, filed on May 30, 2019.

(51) Int. Cl.
*G01C 21/20* (2006.01)
*B63H 25/04* (2006.01)
*G05D 1/02* (2020.01)
*F02B 61/04* (2006.01)

(52) U.S. Cl.
CPC .......... *G01C 21/203* (2013.01); *B63H 25/04* (2013.01); *G05D 1/0206* (2013.01); *F02B 61/045* (2013.01)

(58) Field of Classification Search
CPC ...... G01C 21/00; G01C 21/203; B63H 25/00; B63H 25/04; G05D 1/02; G05D 1/0206; F02B 61/045
USPC ......................................................... 701/21
See application file for complete search history.

(56) References Cited

FOREIGN PATENT DOCUMENTS

JP    2001287697 A  * 10/2001
JP    2017-088111 A    5/2017

OTHER PUBLICATIONS

Ito et al., "Boat Maneuvering Control Method for Boat and Boat Maneuvering Control System for Boat", U.S. Appl. No. 17/468,780, filed Sep. 8, 2021.

* cited by examiner

Primary Examiner — Lars A Olson
(74) Attorney, Agent, or Firm — Keating and Bennett, LLP

(57) ABSTRACT

A boat maneuvering control method for a boat includes acquiring target route information and information about an actual position of the boat, setting a target position based on the target route information and the information about the actual position, acquiring, as a deviation amount, a distance between the target position and the boat in a predetermined direction that intersects with a target route, and controlling a magnitude of a propulsion force of a propulsion device so as to reduce the deviation amount.

21 Claims, 10 Drawing Sheets

BOAT MANEUVERING CONTROL METHOD FOR BOAT AND BOAT MANEUVERING CONTROL SYSTEM FOR BOAT

CROSS REFERENCE TO RELATED APPLICATIONS

This application claims the benefit of priority to Provisional Application No. 62/854,438 filed on May 30, 2019. The entire contents of this application are hereby incorporated herein by reference.

BACKGROUND OF THE INVENTION

1. Field of the Invention

The present invention relates to a boat maneuvering control method for a boat and a boat maneuvering control system for a boat.

2. Description of the Related Art

A boat maneuvering control method for a boat for controlling the magnitude of the propulsion force of a propulsion device such that a distance between a target position and a boat is reduced is known in general. Such a boat maneuvering control method for a boat is disclosed in Japanese Patent Laid-Open No. 2017-088111, for example.

Japanese Patent Laid-Open No. 2017-088111 discloses a boat maneuvering control method for a boat including an outboard motor. In this boat maneuvering control method, first, a target position in a target direction is set. Then, in the target direction, a separation distance between the target position and the boat is acquired as a deviation amount. Then, a target speed according to the deviation amount is set, and an actual speed of the boat is detected. Then, the magnitude of the propulsion force of the outboard motor is controlled based on the target speed and the actual speed of the boat such that the boat is substantially held at the target position in the target direction.

It is conceivable that a user trolls while performing the boat maneuvering control method disclosed in Japanese Patent Laid-Open No. 2017-088111. In other words, it is conceivable that the boat drifts due to the wind or the tide in a direction orthogonal to the target direction while the boat is held at the target position in the target direction. Furthermore, it is conceivable that the user fishes while the boat is drifting along a linear route in the direction orthogonal to the target direction. However, when the user desires the boat to drift along the shape of a river or lake shore, or to drift in the sea (water area) having a predetermined depth, the desired route on which the boat drifts is conceivably not linear but meandering along the shape of the shore or the shape of the water area. In such a case, in order to drift the boat along the desired route that is not linear, the user conceivably needs to frequently reset the target position. Therefore, conventionally, even when the boat drifts along the desired route that is not linear, a boat maneuvering control method for a boat and a boat maneuvering control system for a boat that reduce the number of times the user resets the target position are desired.

SUMMARY OF THE INVENTION

Preferred embodiments of the present invention provide boat maneuvering control methods for boats and boat maneuvering control systems for boats capable of reducing a number of times a user resets a target position even when the boats are moved along desired routes that are not linear.

A boat maneuvering control method for a boat according to a first preferred embodiment of the present invention includes acquiring target route information about a target route as a route on which the boat is to drift, and information about an actual position of the boat, setting a target position based on the target route information and the information about the actual position, acquiring, as a deviation amount, a distance between the target position and the boat in a predetermined direction that intersects with the target route, and controlling a magnitude of a propulsion force of the propulsion device so as to reduce the deviation amount.

In the boat maneuvering control method for a boat according to the first preferred embodiment, as described above, the target position is set based on the target route information and the information about the actual position. Accordingly, even when the target route is a route that is not linear and has a shape that follows the shape of a shore or the shape of a water area, for example, the target position is automatically set based on the target route information and the information about the actual position so as to correspond to the target route. Consequently, even when the boat drifts along a desired route (target route) that is not linear, the number of times a user resets the target position is reduced. Thus, the convenience of maneuvering a boat that is trolling is improved.

In the boat maneuvering control method for the boat according to the first preferred embodiment, the setting of the target position preferably includes setting the target position on the target route of the target route information. Accordingly, the deviation amount between the target position on the target route and the actual position of the boat is reduced, and thus the boat drifts not along a linear shape but along the target route. Consequently, the boat drifts along a route (target route) desired by the user.

In such a case, the setting of the target position preferably includes setting the target position on the target route in a direction along the predetermined direction from the actual position. Accordingly, unlike a case in which the target position is set from arbitrary positions (a plurality of positions) on the target route, the target position is easily set from a position (one position) on the target route in a direction along the predetermined direction from the actual position.

In the boat maneuvering control method for the boat including setting the target position on the target route, the target route information preferably includes information about the target route having a non-linear shape, the acquiring of the actual position preferably includes repeatedly acquiring the information about the actual position, and the setting of the target position preferably includes updating the target position on the target route every time the information about the actual position is acquired. Accordingly, the target position is updated on the non-linear target route as needed, and thus deviation of the target position from the non-linear target route is significantly reduced or prevented. Consequently, the boat more accurately drifts along the target route.

In the boat maneuvering control method for the boat including updating the target position on the target route every time the information about the actual position is acquired, the target route information preferably includes information about the target route shaped to follow a shape of a shore, and the setting of the target position preferably includes updating the target position on the target route every time the information about the actual position is acquired. Accordingly, even when the user trolls along a shore having a relatively complex shape, the boat drifts along the shore without frequent resetting of the target position.

In the boat maneuvering control method for the boat according to the first preferred embodiment, the setting of the target position preferably includes setting the target position based on the target route information and a route length through which the boat has drifted, and the route length is based on the information about the actual position. Accordingly, the target position is set based on the route length through which the boat has drifted, and thus the target position is set at an appropriate position along the course of drifting the boat on the target route, for example.

The boat maneuvering control method for the boat according to the first preferred embodiment preferably further includes setting a target orientation as the predetermined direction, acquiring information about an actual orientation of the boat, acquiring a deviation angle of the actual orientation with respect to the target orientation, and performing a control to bring the actual orientation closer to the target orientation by controlling driving of the propulsion device so as to reduce the deviation angle. Accordingly, even when the orientation of the boat changes, the orientation of the boat is substantially held such that the boat faces the target orientation (desired orientation).

In such a case, the setting of the target orientation preferably includes changing the target orientation based on an operation to change the target orientation. Accordingly, even when the orientation desired by the user changes, the target orientation is changed. For example, when the direction of the wind changes, the target orientation is changed.

In the boat maneuvering control method for the boat according to the first preferred embodiment, the target route information preferably includes information about a planned route, and the setting of the target position preferably includes setting the target route at a position that matches the planned route or setting the target route at a position deviated in the predetermined direction from the planned route. Accordingly, when the planned route is set (when a route on which the boat drifts is set in advance), the planned route is set as the target route. Furthermore, when the planned route is set and the user desires to set the target route at the position deviated in the predetermined direction from the planned route, the target route is set at the position deviated in the predetermined direction from the planned route in response to the user's request.

In such a case, the boat maneuvering control method for the boat preferably further includes receiving an operation to change the target route, and the setting of the target position preferably includes setting the target route at the position deviated in the predetermined direction from the planned route based on the operation to change the target route. Accordingly, when the user desires to change (offset) the target route in the predetermined orientation, the user changes the target route by performing the operation to change the target route.

The boat maneuvering control method for the boat according to the first preferred embodiment preferably further includes receiving an operation to start control of the magnitude of the propulsion force of the propulsion device so as to reduce the deviation amount, and the setting of the target position preferably includes setting the target position based on the target route information and the actual position when the target route information has been acquired when the operation to start control is received, and setting a current position of the boat at the target position when the target route information has not been acquired when the operation to start control is received. Accordingly, when the user desires to troll along the target route and has acquired the target route information, the boat drifts along the target route, and when the user desires to hold the boat at the target position in the predetermined direction, the boat is held at the current position of the boat in the predetermined direction.

In such a case, the boat maneuvering control method preferably further includes acquiring information about a direction in which the boat drifts, and the setting of the target position preferably includes setting the target position based on the target route information and the information about the actual position when the target route information has been acquired and the target route is along the direction in which the boat drifts when the operation to start control is received. When the target route is along the direction in which the boat drifts, the boat may conceivably drift along the target route. In view of this, as described above, the target position is set when the target route is along the direction in which the boat drifts such that the target position is set in an appropriate case in which the boat drifts along the target route. That is, when the target route is suitable for a course of drifting the boat, a control to allow the boat to drift along the target route is effectively performed.

The boat maneuvering control method for the boat according to the first preferred embodiment preferably further includes setting a target speed according to the deviation amount, and acquiring information about an actual speed of the boat, and the controlling of the magnitude of the propulsion force preferably includes controlling the magnitude of the propulsion force based on the target speed and the information about the actual speed so as to reduce the deviation amount. Accordingly, the controlling is based on the target speed and the information about the actual speed, and thus the magnitude of the propulsion force is easily controlled such that the deviation amount is reduced.

A boat maneuvering control system for a boat according to a second preferred embodiment of the present invention includes a propulsion device, and a controller configured or programmed to acquire target route information about a target route as a route on which the boat including the propulsion device drifts, and information about an actual position of the boat, to set a target position based on the target route information and the information about the actual position, to acquire, as a deviation amount, a distance between the target position and the boat in a predetermined direction that intersects with the target route, and to control a magnitude of a propulsion force of the propulsion device so as to reduce the deviation amount.

In the boat maneuvering control system for a boat according to the second preferred embodiment of the present invention, similarly to the boat maneuvering control method according to the first preferred embodiment, even when the boat drifts along a desired route that is not linear, the number of times a user resets the target position is reduced.

In the boat maneuvering control system for a boat according to the second preferred embodiment, the controller is preferably configured or programmed to set the target position based on the target route information and a route length through which the boat has drifted, wherein the route length is based on the information about the actual position of the boat. Accordingly, the target position is set based on the route length through which the boat is drifting, and thus the target position is set at an appropriate position along the course of drifting the boat on the target route, for example.

The boat maneuvering control system for a boat according to the second preferred embodiment preferably further includes an orientation acquirer that acquires information about an actual orientation of the boat, and the controller is preferably configured or programmed to set a target orientation as the predetermined direction, to acquire a deviation angle of the actual orientation with respect to the target orientation, and to perform a control to bring the actual orientation closer to the target orientation by controlling driving of the propulsion device so as to reduce the deviation angle. Accordingly, even when the orientation of the boat changes, the orientation of the boat is substantially held such that the boat faces the target orientation (desired orientation).

In such a case, the boat maneuvering control system for a boat preferably further includes a target orientation change operator that receives an operation to change the target orientation, and the controller is preferably configured or programmed to change the target orientation based on the operation to change the target orientation. Accordingly, even when the orientation desired by the user changes, the target orientation is changed. Consequently, when the direction of the wind changes, or when a desired direction, in which the user desires the boat to drift, changes, the target orientation is appropriately set.

The boat maneuvering control system for a boat according to the second preferred embodiment preferably further includes a start operator that receives an operation to start control of the magnitude of the propulsion force of the propulsion device so as to reduce the deviation amount, and the controller is preferably configured or programmed to set the target position based on the target route information and the information about the actual position when the target route information has been acquired when the operation on the start operator is received, and to set a current position of the boat at the target position when the target route information has not been acquired when the operation on the start operator is received. Accordingly, when the user desires to troll along the target route and has acquired the target route information, the boat drifts along the target route, and when the user desires to hold the boat at the target position in the predetermined direction, the boat is held at the current position of the boat in the predetermined direction.

In such a case, the controller is preferably configured or programmed to acquire information about a direction in which the boat drifts based on cruise information of the boat, and to set the target position based on the target route information and the actual position when the target route information has been acquired and the target route is along the direction in which the boat drifts when the operation on the start operator is received. Accordingly, the target position is set in an appropriate case in which the boat drifts along the target route. That is, when the target route is suitable for the boat to drift, a control to allow the boat to drift along the target route is effectively performed.

In the boat maneuvering control system for a boat according to the second preferred embodiment, the boat preferably includes a plurality of propulsion devices, and the controller is preferably configured or programmed to control the magnitude of the propulsion force of each of the plurality of propulsion devices so as to reduce the deviation amount. Accordingly, even when a plurality of propulsion devices are provided on the boat, the magnitude of the propulsion force of each of the plurality of propulsion devices is controlled such that the deviation amount is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

Structure of Boat

The structure of a boat 1 including a boat maneuvering control system 100 according to preferred embodiments of the present invention is now described with reference to FIGS. 1 to 13. In the figures, arrow FWD represents the forward movement direction of the boat 1 in a forward-rearward direction, and arrow BWD represents the reverse movement direction of the boat 1. In addition, in the figures, arrow R represents the starboard direction of the boat 1 in a right-left direction (a direction perpendicular to the forward-rearward direction), and arrow L represents the portside direction of the boat 1. The boat 1 is a fishing boat or a fishing vessel for a user to fish, for example.

Figure 1:
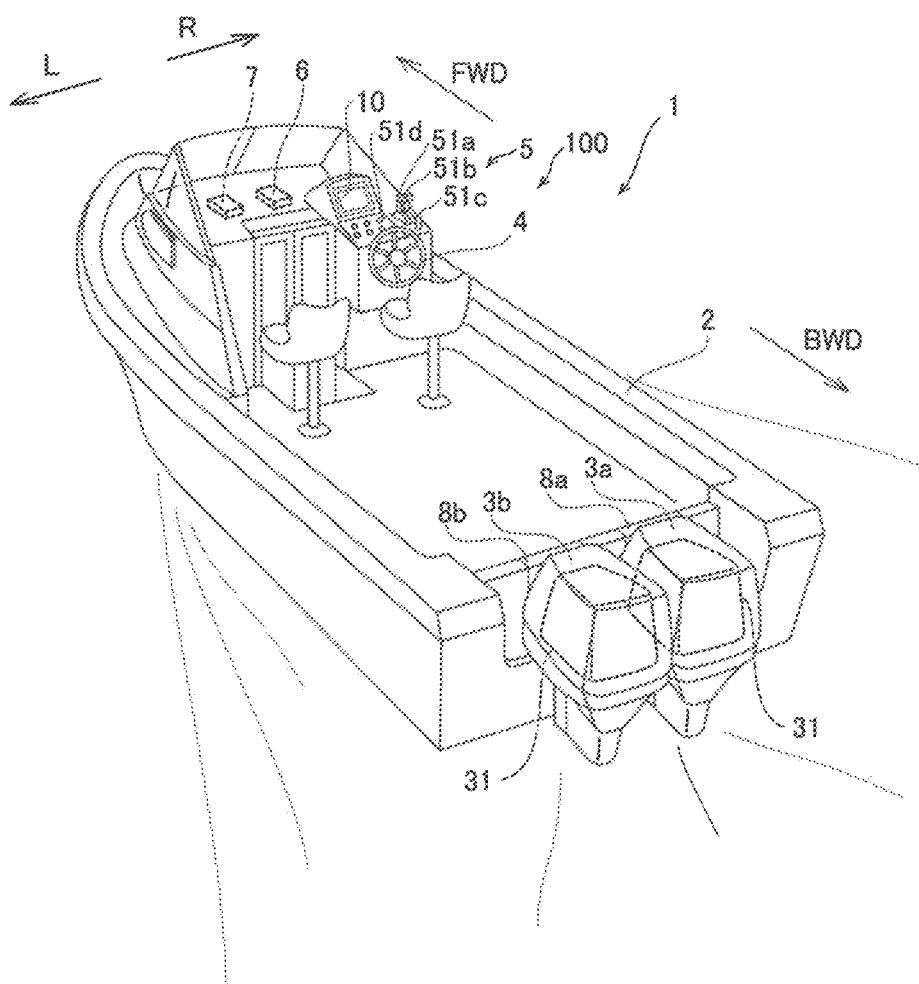
FIG. 1 is a perspective view showing the structure of a boat including a boat maneuvering control system according to a preferred embodiment of the present invention.

As shown in FIG. 1, the boat 1 includes a hull 2, a cruise information display 10, and the boat maneuvering control system 100.

Structure of Boat Maneuvering Control System

Figure 2:
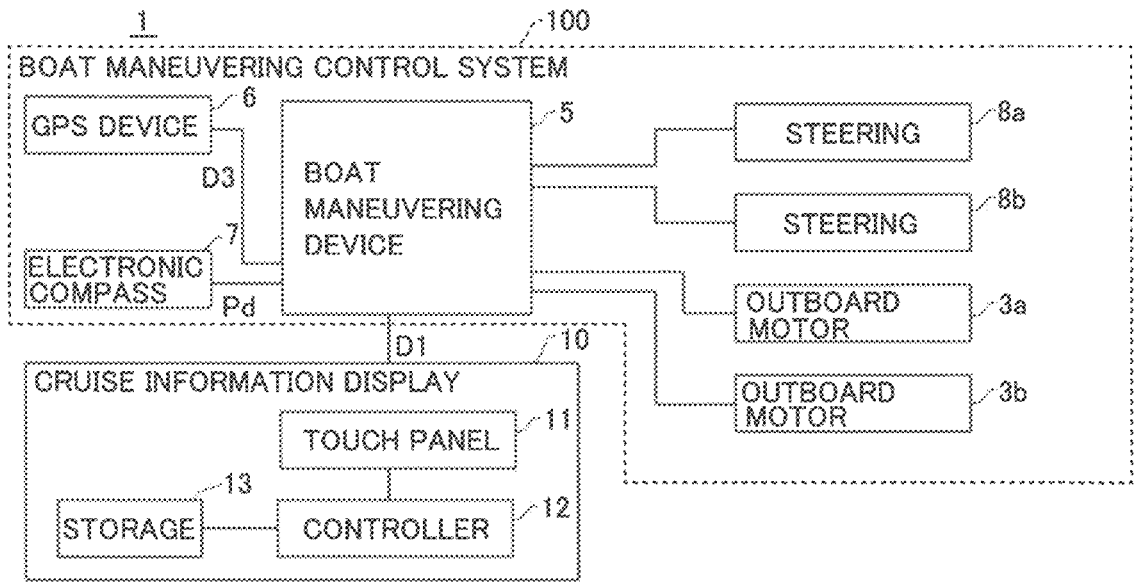
FIG. 2 is a block diagram showing the structure of a boat maneuvering control system according to a preferred embodiment of the present invention.

As shown in FIG. 2, the boat maneuvering control system 100 includes outboard motors 3a and 3b, a steering wheel 4, a boat maneuvering device 5, a global positioning system (GPS) device 6, an electronic compass 7, and steerings 8a and 8b. The outboard motors 3a and 3b are examples of a "propulsion device". The electronic compass 7 is an example of an "orientation acquirer".

Figure 3:
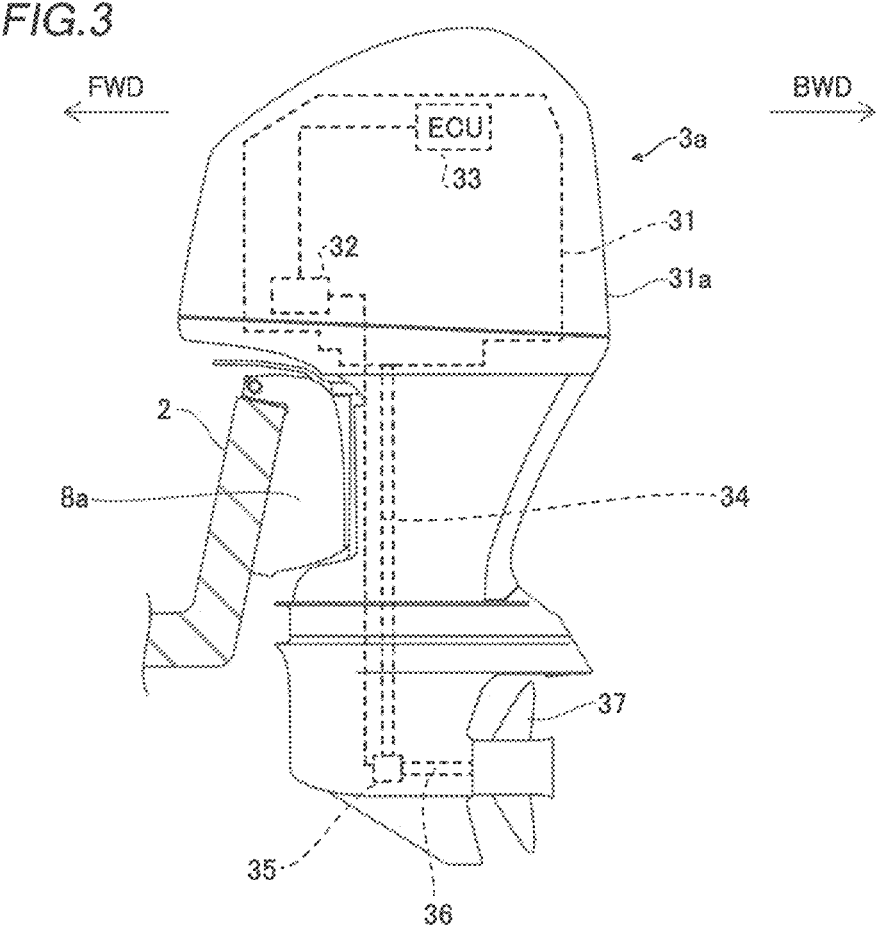
FIG. 3 is a side view showing the structure of an outboard motor according to a preferred embodiment of the present invention.

As shown in FIG. 3, the outboard motor 3a includes an engine 31, a shift actuator 32, an engine control unit (ECU) 33, a drive shaft 34, a gearing 35, a propeller shaft 36, and a propeller 37. The structure of the outboard motor 3b is the same as the structure of the outboard motor 3a, and thus description thereof is omitted.

The engine 31 is provided in an upper portion of the outboard motor 3a, and is an internal combustion engine driven by explosive combustion of gasoline or light oil, for example. The engine 31 is covered by an engine cover 31a.

The shift actuator 32 switches the shift state of the outboard motor 3a to one of a forward movement state (shift F), a reverse movement state (shift R), and a neutral state (neutral). When the shift state of the outboard motor 3a is the forward movement state, the propulsion force of the outboard motor 3a is generated toward the FWD side, when the shift state is the reverse movement state, the propulsion force of the outboard motor 3a is generated toward the BWD side, and when the shift state is the neutral state, the propulsion force of the outboard motor 3a is not generated. Furthermore, the shift actuator 32 switches the shift state by switching the meshing of the gearing 35. The propulsion force of the outboard motor 3a is defined as F1, and the propulsion force of the outboard motor 3b is defined as F2.

The ECU 33 controls driving of the engine 31 and driving of the shift actuator 32 based on commands from a controller 52 of the boat maneuvering device 5. The drive shaft 34 is coupled to a crankshaft (not shown) of the engine 31 so as to transmit the power of engine 31. The gearing 35 reduces rotation of the drive shaft 34 and transmits the reduced rotation to the propeller shaft 36. Furthermore, the propeller 37 (screw) is connected to the propeller shaft 36. The propeller 37 is driven to rotate about a rotation axis that extends in the forward-rearward direction. The propeller 37 generates the propulsion force F1 in an axial direction by rotating in water. The propeller 37 moves the hull 2 forward or rearward according to the rotation direction switched depending on the shift state.

Figure 4:
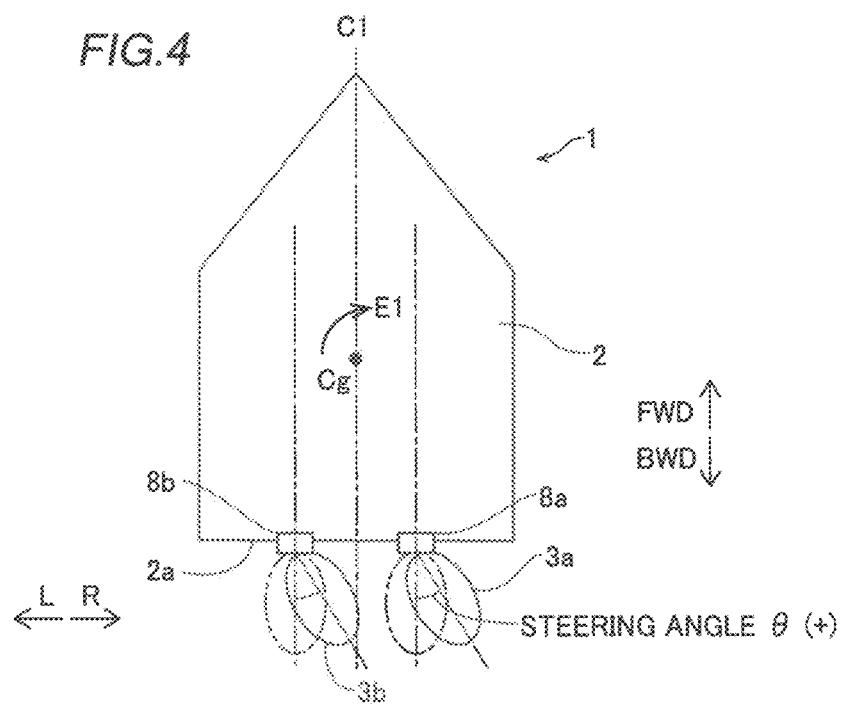
FIG. 4 is a schematic view illustrating the steering angles of outboard motors according to a preferred embodiment of the present invention.

As shown in FIG. 4, the outboard motor 3a is attached to a stern 2a of the hull 2 via the steering 8a. The outboard motor 3a is disposed rightward of a centerline C1 of the hull 2 in the right-left direction. The outboard motor 3a is attached to the hull 2 so as to be rotatable by a predetermined angular range about each of an upward-downward axis and a horizontal axis by the steering 8a. Furthermore, the outboard motor 3b is attached to the stern 2a of the hull 2 via the steering 8b. The outboard motor 3b is disposed leftward of the centerline C1 of the hull 2 in the right-left direction. The outboard motor 3b is attached to the hull 2 so as to be rotatable by a predetermined angular range about each of the upward-downward axis and the horizontal axis by the steering 8b. The steering angles θ of the outboard motors 3a and 3b are angles defined by a direction (forward-rearward direction) parallel to the centerline C1 and the outboard motors 3a and 3b in a horizontal direction. When the outboard motors 3a and 3b rotate counterclockwise with respect to the direction (forward-rearward direction) parallel to the centerline C1, the steering angles θ are set to positive values (+), and when the outboard motors 3a and 3b rotate clockwise with respect to the direction (forward-rearward direction) parallel to the centerline C1, the steering angles θ are set to negative values (−). For example, when both the outboard motors 3a and 3b have positive steering angles θ, the boat 1 turns right (in a direction along arrow E1). The centerline C1 passes through the center of gravity Cg of the hull 2.

Figure 5:
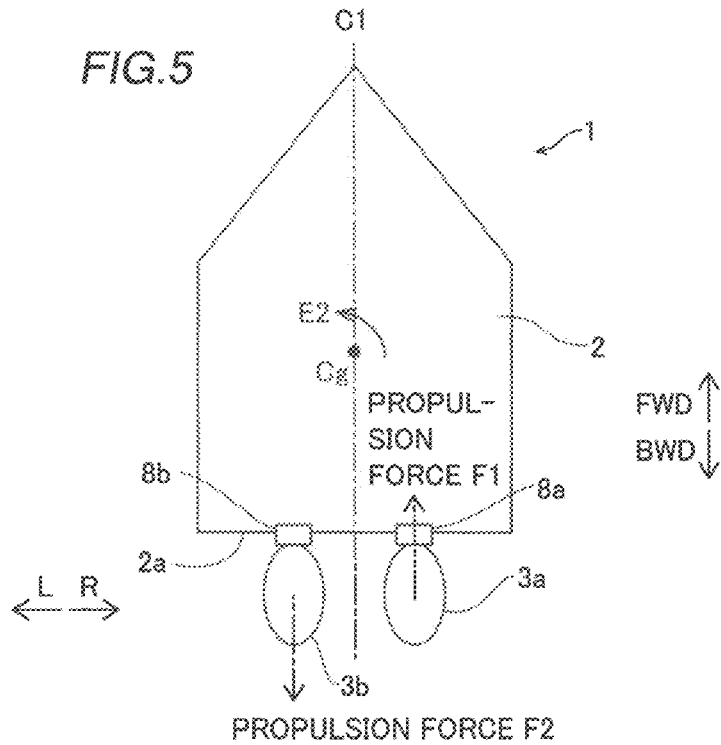
FIG. 5 is a schematic view illustrating boat turning according to a preferred embodiment of the present invention.

As shown in FIG. 5, even when the steering angles of the outboard motors 3a and 3b are both 0, the boat 1 turns left (in a direction along arrow E2) when the direction of the propulsion force F1 of the outboard motor 3a is a forward movement direction, and the direction of the propulsion force F2 of the outboard motor 3b is a reverse movement direction. Even when the steering angles of the outboard motors 3a and 3b are both 0, the boat 1 turns right when the direction of the propulsion force F1 of the outboard motor 3a is a reverse movement direction, and the direction of the propulsion force F2 of the outboard motor 3b is a forward movement direction.

The steering wheel 4 steers the hull 2 (turns the outboard motors 3a and 3b), as shown in FIG. 1. Specifically, the steering wheel 4 is connected to the steerings 8a and 8b. The steerings 8a and 8b respectively rotate the outboard motors 3a and 3b in the horizontal direction based on operation of the steering wheel 4.

Figure 6:
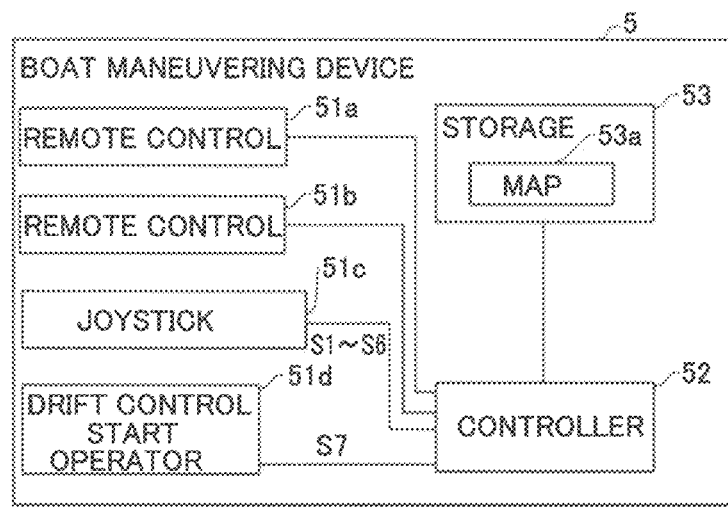
FIG. 6 is a block diagram showing the structure of a boat maneuvering device according to a preferred embodiment of the present invention.

As shown in FIG. 6, the boat maneuvering device 5 includes remote controls 51a and 51b, a joystick 51c, a drift control start operator 51d, the controller 52, and a storage 53. The joystick 51c is an example of a "target orientation change operator". The drift control start operator 51d is an example of a "start operator".

The boat maneuvering device 5 operates the shift state and the propulsion force of the outboard motor 3a and the shift state and the propulsion force of the outboard motor 3b. Specifically, the remote control 51a is connected to the outboard motor 3a. The remote control 51b is connected to the outboard motor 3b. The controller 52 is configured or programmed to control the shift state and the propulsion force of the outboard motor 3a (outboard motor 3b) based on operation of the remote control 51a (remote control 51b). Furthermore, as shown in FIG. 1, the remote controls 51a and 51b each include a lever. The position of the lever of each of the remote controls 51a and 51b is changed such that each of the remote controls 51a and 51b changes the shift state and propulsion force (the value of an operation signal) to be commanded.

The joystick 51c has a columnar shape, as shown in FIG. 1. The joystick 51c has a function of operating the shift state and the propulsion force of each of the outboard motors 3a and 3b when a drift control described below is not performed by the controller 52. The joystick 51c also has a function of performing an operation to change a target route R2 and an operation to change a target orientation Td, which are described below, when the drift control is performed by the controller 52.

Figure 7:
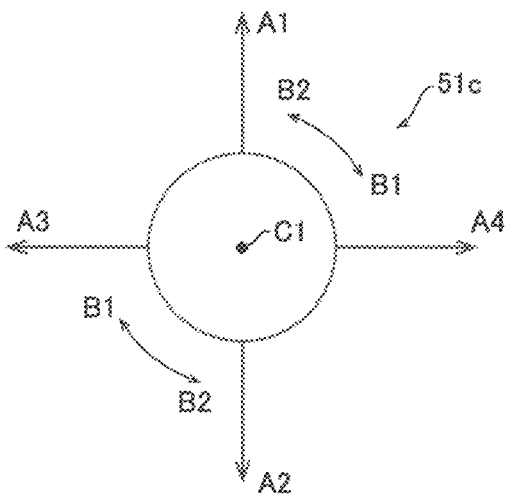
FIG. 7 is a schematic view illustrating the structure of a joystick according to a preferred embodiment of the present invention.

As shown in FIG. 7, when the joystick 51c is operated by the user to tilt forward (in a direction along arrow A1), a forward movement signal S1 is output to the controller 52. When the joystick 51c is operated by the user to tilt rearward (in a direction along arrow A2), a reverse movement signal S2 is output to the controller 52. When the joystick 51c is operated by the user to tilt leftward (in a direction along arrow A3), a leftward movement signal S3 is output to the controller 52. When the joystick 51c is operated by the user to tilt rightward (in a direction along arrow A4), a rightward movement signal S4 is output to the controller 52. The operation of tilting the joystick 51c forward (in the direction along arrow A1) and the operation of tilting the joystick 51c rearward (in the direction along arrow A2) are examples of an "operation to change the target route".

When the joystick 51c is operated by the user to rotate in a direction along arrow B1 (clockwise), a right turn signal S5 to change the orientation of the boat 1 to the direction along arrow B1 (clockwise) is output to the controller 52. When the joystick 51c is operated by the user to rotate in a direction along arrow B2 (counterclockwise), a left turn signal S6 to change the orientation of the boat 1 to the direction along arrow B2 (counterclockwise) is output to the controller 52. The operation of rotating the joystick 51c in the direction along arrow B1 (clockwise) and the operation of rotating the joystick 51c in the direction along arrow B2 (counterclockwise) are examples of an "operation of change the target orientation".

The drift control start operator 51d includes a push button or a touch panel, for example. The drift control start operator 51d transmits, to the controller 52, an operation signal S7 to start the drift control described below based on an operation by the user.

The controller 52 is a control circuit, for example, and includes a central processing unit (CPU). When the drift control is not performed, the controller 52 is configured or programmed to perform the following control. Specifically, the controller 52 is configured or programmed to control the shift state and the propulsion force of the outboard motor 3a based on an operation on the remote control 51a. Furthermore, the controller 52 is configured or programmed to control the shift state and the propulsion force of the outboard motor 3a based on an operation on the remote control 51a.

When acquiring the forward movement signal S1 from the joystick 51c, the controller 52 is configured or programmed to control the outboard motors 3a and 3b to generate the propulsion forces, and setting the shift states of both the outboard motors 3a and 3b to forward movement states. When acquiring the reverse movement signal S2 from the joystick 51c, the controller 52 is configured or programmed to control the outboard motors 3a and 3b to generate the propulsion forces F1 and F2, and setting the shift states of both the outboard motors 3a and 3b to reverse movement states. When acquiring the leftward movement signal S3 from the joystick 51c, the controller 52 is configured or programmed to control the outboard motors 3a and 3b to generate the propulsion forces F1 and F2 so as to move the boat 1 leftward, and setting the shift states of the outboard motors 3a and 3b to different states. When acquiring the rightward movement signal S4 from the joystick 51c, the controller 52 is configured or programmed to control the outboard motors 3a and 3b to generate the propulsion forces F1 and F2 so as to move the boat 1 rightward, and setting the shift states of the outboard motors 3a and 3b to different states. When acquiring the right turn signal S5 from the joystick 51c, the controller 52 is configured or programmed to control the outboard motors 3a and 3b to generate the propulsion forces F1 and F2 so as to turn the boat 1 right. When acquiring the left turn signal S6 from the joystick 51c, the controller 52 is configured or programmed to control the outboard motors 3a and 3b to generate the propulsion forces F1 and F2 so as to turn the boat 1 left. The operation of the controller 52 during the drift control is described below in detail.

Figure 8:
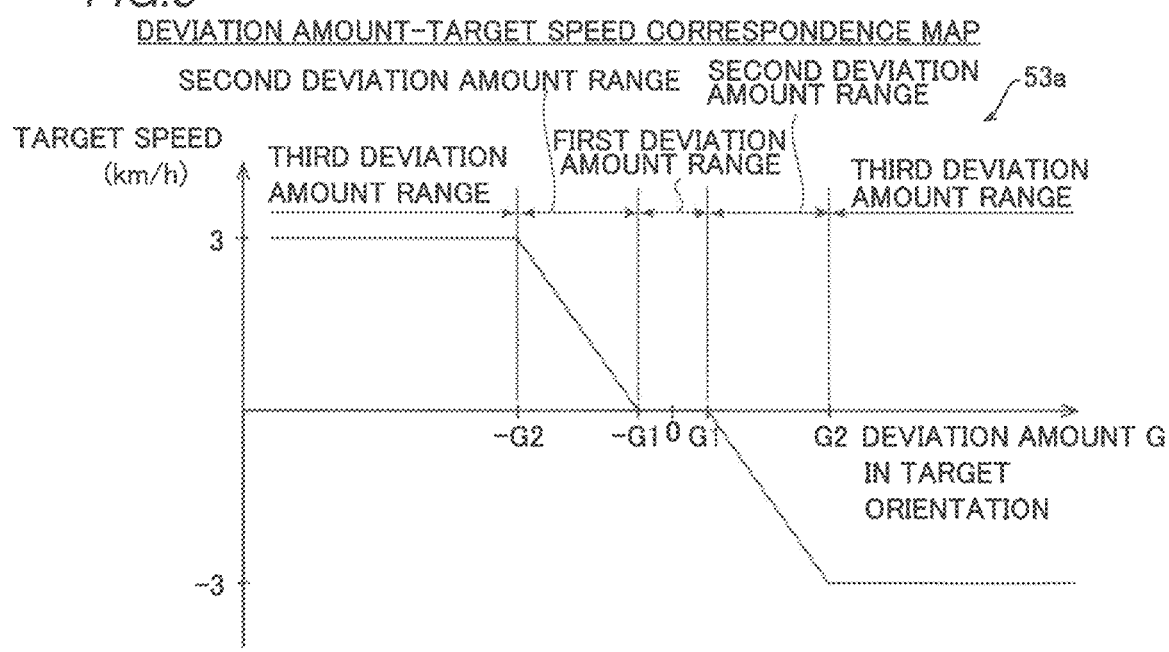
FIG. 8 is a diagram showing a deviation-target speed comparison map according to a preferred embodiment of the present invention.

As shown in FIGS. 6 and 8, the storage 53 stores a deviation amount-target speed comparison map 53a, and also stores the target route R2, a target position Tp, and the target orientation Td, which are described below. The target orientation Td is an example of a "predetermined direction".

The GPS device 6 measures positional information D3 including the current position Pp (see FIG. 11) of the boat 1 and the actual (current) speed of the boat 1. For example, the GPS device 6 detects the actual speed of the boat 1 based on a temporal change in the detected position of the boat 1. The controller 52 and the cruise information display 10 acquire the positional information D3 of the boat 1 and the actual speed of the boat 1 detected by the GPS device 6.

The electronic compass 7 measures the actual orientation Pd of the boat 1, which is the direction (FWD) of the bow of the boat 1. The controller 52 and the cruise information display 10 acquire the actual orientation Pd detected by the electronic compass 7.

Structure of Cruise Information Display

Figure 9:
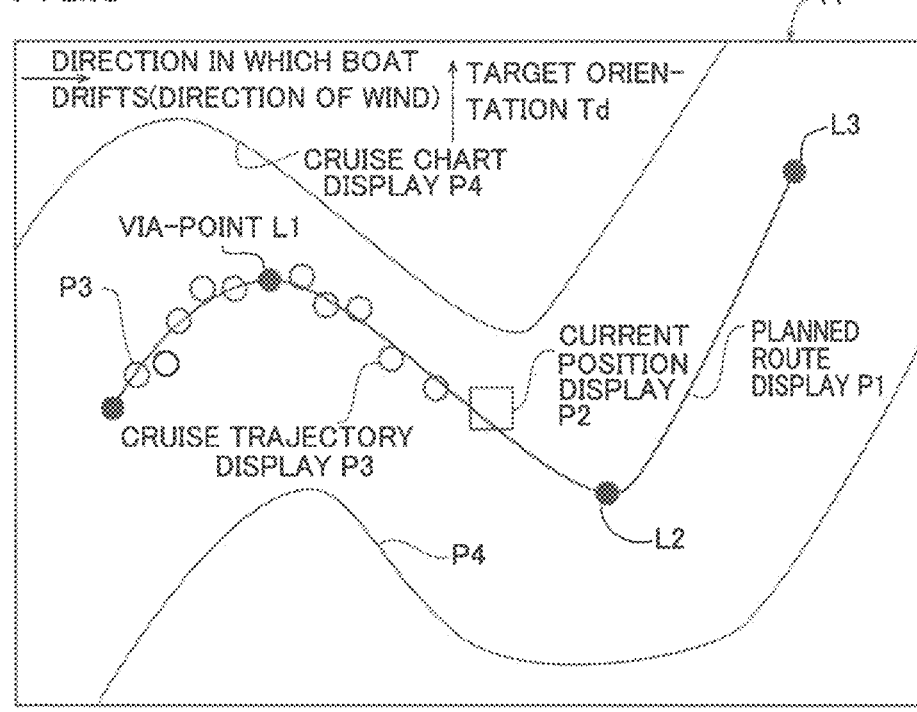
FIG. 9 is a diagram showing an example of display on a cruise information display according to a preferred embodiment of the present invention.

As shown in FIG. 2, the cruise information display 10 includes a touch panel 11, a controller 12, and a storage 13. As shown in FIG. 9, the cruise information display 10 shows, on the touch panel 11, a planned route display P1, which is a display of a planned route R1, a current position display P2 that indicates the current position Pp of the boat 1, a cruise trajectory display P3 that indicates a trajectory of the boat 1 that is cruising, and a cruise chart display P4 in combination.

The controller 12 of the navigation information display 10 is configured or programmed to receive a setting of a plurality of via-points L based on a touch operation on the touch panel 11 by the user. The controller 12 is configured or programmed to acquire (calculate and determines) the planned route R1 based on information about the plurality of via-points L. For example, as shown in FIG. 9, when via-points L1, L2, and L3 are set, the controller 12 is configured or programmed to connect via-points L1, L2, and L3 to determine the non-linear (meandering) planned route R1. For example, the planned route R1 is shaped to follow the shape of a river shore or the shape of an area of the sea having a predetermined depth. The controller 12 is configured or programmed to transmit planned route information D1, which is information about the planned route R1, to the controller 52 of the boat maneuvering control system 100.

The controller 12 is configured or programmed to generate the planned route display P1 based on the planned route R1. The controller 12 is configured or programmed to acquire the positional information D3 (the current position Pp of the boat 1) from the GPS device 6, and generate the current position display P2 based on the positional information D3. The controller 12 is configured or programmed to generate the cruise trajectory display P3 based on the positional information D3 (the actual position of the boat 1) acquired from the GPS device 6. The controller 12 is configured or programmed to generate the cruise chart display P4 based on cruise chart information (such as marine chart information and waterway information) stored in the storage 13. The planned route display P1 is shown by a mark of a linear or predetermined (round or quadrangular) shape, for example, on the touch panel 11. The current position display P2 is shown by a mark of a predetermined shape (round or quadrangular) or a schematic image of a boat, for example, on the touch panel 11. The cruise trajectory display P3 is shown by a line (or a plurality of dots), for example, on the touch panel 11. The positional information D3 is an example of an "actual position".

Figure 10:
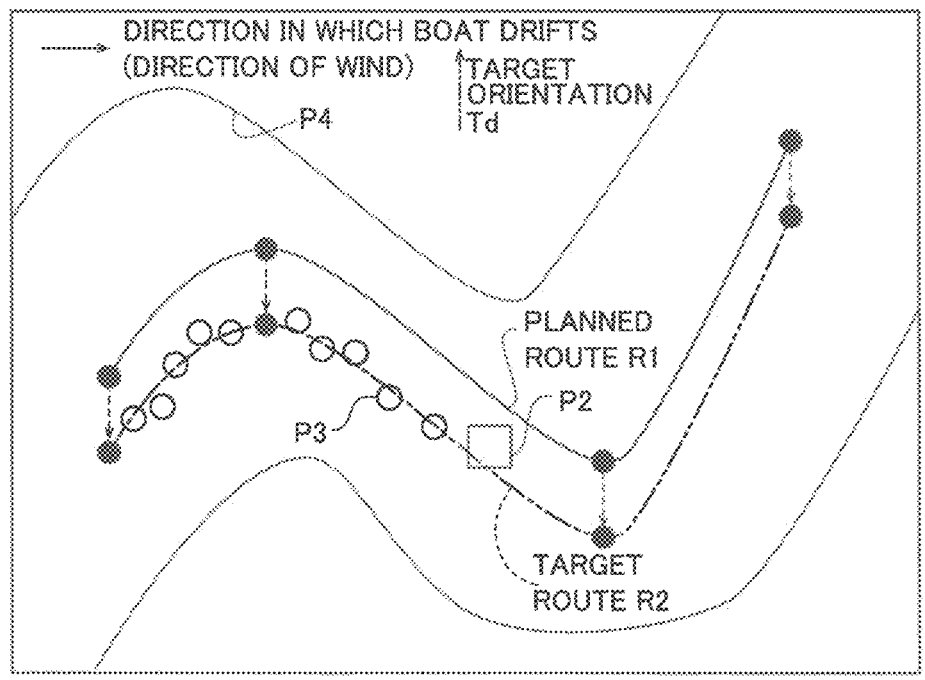
FIG. 10 is a diagram illustrating setting of a target route according to a preferred embodiment of the present invention.

FIG. 9 shows an example in which the target route R2 is set at a position that matches the planned route R1. FIG. 10 shows an example in which when an operation to change the target route R2 described below is performed, the target route R2 that has been deviated in a direction parallel to a direction along the target orientation Td from the planned route R1 is set.

Structure of Boat Maneuvering Control

According to a preferred embodiment, the controller 52 of the boat maneuvering control system 100 is configured or programmed to control driving of the outboard motors 3a and 3b and driving of the steerings 8a and 8b such that the boat 1 drifts along the target route R2 as a route on which the boat 1 including the outboard motors 3a and 3b drifts (hereinafter referred to as a "drift control").

Figure 11:
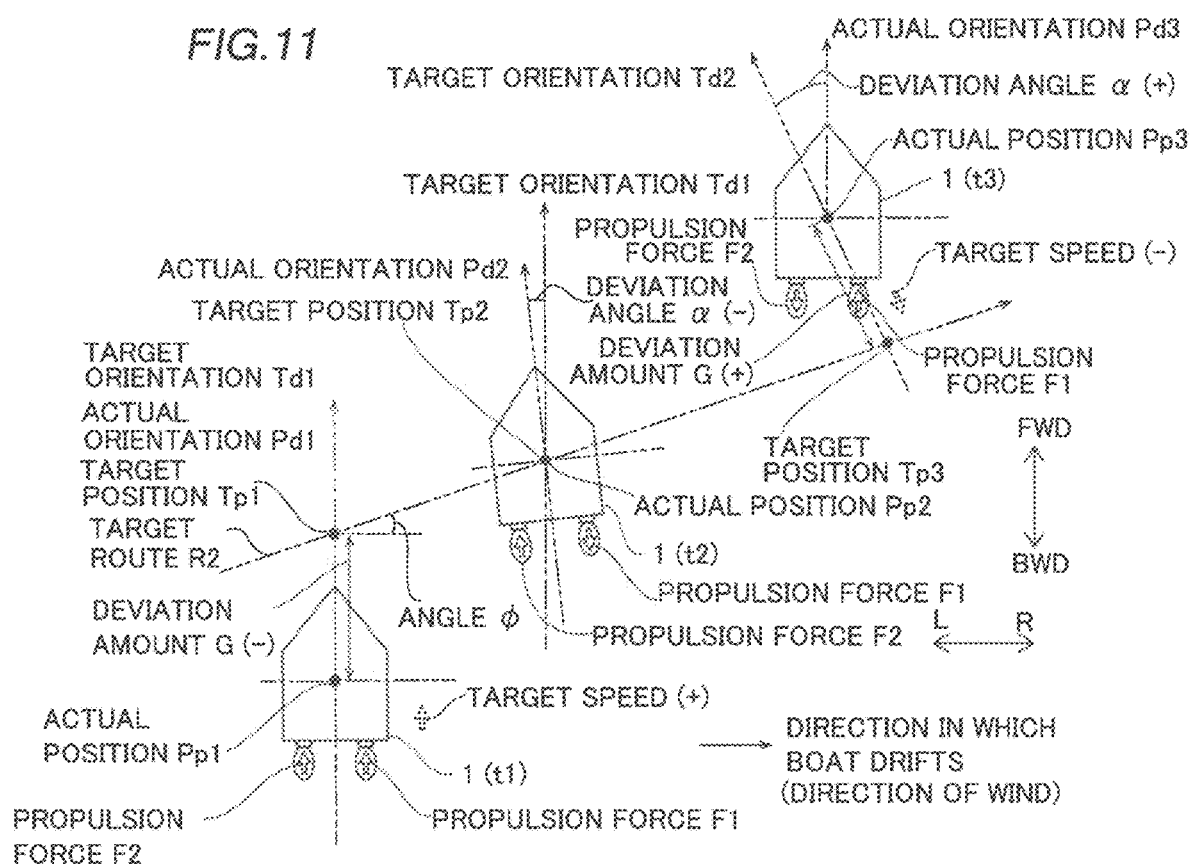
FIG. 11 is a diagram illustrating setting of a target position and a target orientation according to a preferred embodiment of the present invention.

Specifically, the controller 52 is configured or programmed to acquire target route information D2, which is information about the target route R2, and the positional information D3, which is information about the actual position of the boat 1. As shown in FIG. 11, the controller 52 is configured or programmed to set the target position Tp based on the target route information D2 and the positional information D3.

More specifically, the controller 52 is configured or programmed to acquire, as a deviation amount G, a distance between the target position Tp and the boat 1 (current position Pp) in the target orientation Td as a predetermined direction that intersects with the target route R2. The controller 52 is configured or programmed to control the magnitude of each of the propulsion force F1 of the outboard motor 3a and the propulsion force F2 of the outboard motor 3b so as to reduce the deviation amount G. When the boat 1 is deviated to the target orientation Td side with respect to the target position Tp, the deviation amount G is set to a positive value (+), and when the boat 1 is deviated to the opposite side to the target orientation Td with respect to the target position Tp, the deviation amount G is set to a negative value (−).

Structure of Acquisition of Target Route Information

The controller 52 is configured or programmed to acquire (generate and set) the target route information D2 based on the planned route information D1 acquired from the cruise information display 10. Specifically, the controller 52 is configured or programmed to first set the target route R2 at a position that matches the planned route R1 of the planned route information D1, as shown in FIG. 9. Furthermore, as shown in FIG. 10, when the controller 52 is performing the drift control, the target route R2 is set, and the joystick 51c receives an operation to change the target route R2, the controller 52 changes the target route R2 to a position deviated in the direction along the target orientation Td from the planned route R1. The controller 52 is configured or programmed to store the set target route R2 in the storage 53.

According to a preferred embodiment, as shown in FIGS. 9 and 10, the planned route R1 is non-linear, as described above, and thus the target route R2 shaped to correspond to the shape of the planned route R1 is non-linear. Furthermore, the planned route R1 is shaped to follow the shape of the shore, and thus the target route R2 shaped to correspond to the shape of the planned route R1 is shaped to follow the shape of the shore.

Structure of Target Position Setting and Target Orientation Setting

As shown in FIG. 11, the controller 52 is configured or programmed to set the target position Tp based on the target route information D2 and the positional information D3 when the target route information D2 has been acquired (when the target route information D2 has been set) when the controller 52 receives, via the drift control start operator 51d (see FIG. 6), the operation signal S7 to start the drift control (hereinafter referred to as an "operation signal S7"). Furthermore, the controller 52 is configured or programmed to set the current position Pp based on the positional information D3 at the target position Tp when the target route information D2 has not been acquired when the controller 52 receives the operation signal S7. FIG. 11 illustrates a case in which the target position Tp is set based on the target route information D2 and the positional information D3.

The controller 52 is configured or programmed to acquire, based on cruise information D5 of the boat 1, information about a direction in which the boat 1 drifts. Specifically, the controller 52 is configured or programmed to acquire the cruise information D5 based on the positional information D3 acquired in the past and the current positional information D3. The controller 52 is configured or programmed to set the target position Tp based on the target route information D2 and the positional information D3 when the target route information D2 has been acquired and the target route R2 is along the direction in which the boat 1 drifts when the controller 52 receives the operation signal S7. Note that a case in which the target route R2 is along the direction in which the boat 1 drifts refers to a case in which an angle θ defined by the direction of the target route R2 and the direction in which the boat 1 drifts (in the case of FIG. 11, a direction along arrow R) is less than 90 degrees, for example. The controller 52 is configured or programmed to start the drift control based on reception of the operation signal S7 and the target route R2 along the direction in which the boat 1 drifts. When the cruise information display 10 is able to output the cruise information D5, the controller 52 may be configured or programmed to acquire the cruise information D5 from the cruise information display 10.

An example of the structure of the drift control of the controller 52 is now described with reference to FIG. 1. The controller 52 is configured or programmed to first acquire the actual orientation Pd from the electronic compass 7 at a time t1, and set an actual orientation Pd1 at the time of starting the drift control as a target orientation Td1. The controller 52 is configured or programmed to store the set target orientation Td1 in the storage 53.

The controller 52 is configured or programmed to then set the target position Tp1 on the target route R2 in a direction along the target orientation Td1 from the actual position (current position Pp1). That is, the controller 52 is configured or programmed to set a point at which a line along the target orientation Td1 intersects with the target route R2 as the target position Tp1. The boat 1 drifts in a direction (R direction in the case of FIG. 11) that intersects with the target orientation Td1 such that the target position Tp1 set at the time t1 and a position on the target route R2 in the target orientation Td1 from the boat 1 at a time t2 after the time t1 are deviated from each other.

The controller 52 is configured or programmed to repeatedly acquire the positional information D3 from the GPS device 6 at a predetermined cycle. According to a preferred embodiment, the controller 52 is configured or programmed to update the target position Tp every time the positional information D3 is acquired. Thus, the controller 52 is able to newly set a target position Tp2 on the target route R2 at the time t2. For example, the controller 52 is configured or programmed to set the target position Tp based on the target route information D2 (the information about the target route R2) and information D4 about a route length, through which the boat 1 has drifted, based on the repeatedly acquired positional information D3. The information D4 about the route length through which the boat 1 has drifted refers to the amount of change in the coordinate of the boat 1 in the direction in which the boat 1 drifts or a direction perpendicular to the target orientation Td1 (the amount of change of the coordinate of the boat 1 at the time t2 with respect to the coordinate of the boat 1 at the time t1), for example.

Structure of Control to Change Target Route and Control to Change Target Orientation The controller 52 is configured or programmed to offset the target route R2 from the planned route R1 based on an operation on the joystick 51*c* by the user. Specifically, the controller 52 is configured or programmed to change the target route R2 to a position deviated forward in the direction along the target orientation Td from the planned route R1 when acquiring the forward movement signal S1 from the joystick 51*c* during the drift control. The controller 52 is configured or programmed to change the target route R2 to a position deviated rearward in the direction along the target orientation Td from the planned route R1 when acquiring the reverse movement signal S2 from the joystick 51*c* during the drift control. Furthermore, the controller 52 is configured or programmed to determine the amount of change in the target route R2 according to the operation amount or operation period of the joystick 51*c*. For example, the controller 52 increases the amount of change in the target route R2 as the operation amount or operation period of the joystick 51*c* increases.

The controller 52 is configured or programmed to change the target orientation Td based on an operation on the joystick 51*c* by the user. Specifically, the controller 52 is configured or programmed to change the target orientation Td clockwise (in the direction along arrow B1 in FIG. 7) when acquiring the right turn signal S5 from the joystick 51*c* during the drift control. The controller 52 is configured or programmed to change the target orientation Td counterclockwise (in the direction along arrow B2 in FIG. 7) when acquiring the left turn signal S6 from the joystick 51*c* during the drift control. For example, as shown in FIG. 11, the controller 52 is configured or programmed to change the target orientation Td1 set at the time t2 to a target orientation Td2 when acquiring the left turn signal S6 from the joystick 51*c* during the drift control (at a time t3 after the time t2 in FIG. 11).

Structure of Control to Reduce Deviation Amount

As shown in FIG. 11, the controller 52 is configured or programmed to control driving of the outboard motors 3*a* and 3*b* so as to reduce the deviation amount G. Specifically, first, the controller 52 sets the target speed of the boat 1 based on the deviation amount G. At this time, the controller 52 sets the target speed of the boat 1 based on the deviation amount-target speed comparison map 53*a* (hereinafter referred to as a "map 53*a*") shown in FIG. 8. When the absolute value of the deviation amount G is equal to or smaller than a first deviation amount threshold G1 (within a first deviation amount range), the target speed is set to 0 km/h (zero) based on the map 53*a*. When the absolute value of the deviation amount G is larger than the first deviation amount threshold G1 and equal to or smaller than a second deviation amount threshold G2 (within a second deviation amount range), the target speed is set in a direction in which the deviation amount is reduced based on the map 53*a*. That is, when the deviation amount G is a positive value, the target speed is in an opposite direction (negative value) to the target orientation Td1, and when the deviation amount G is a negative value, the target speed is in the target orientation Td1 (positive value). At this time, as the absolute value of the deviation amount G increases, the absolute value of the target speed linearly increases. When the absolute value of the deviation amount G is larger than the second deviation amount threshold G2 (within a third deviation amount range), the target speed is set in the direction in which the deviation amount is reduced based on the map 53*a*. At this time, the absolute value of the target speed is set to a predetermined upper limit regardless of the absolute value of the deviation amount G. For example, in FIG. 8, the absolute value of the target speed is set to, for example, 3 km/h or less regardless of the absolute value of the deviation amount G. This predetermined upper limit (3 km/h) is sufficiently smaller than the maximum speeds of the outboard motors 3*a* and 3*b*.

As shown in FIG. 11, the controller 52 is configured or programmed to control the magnitudes and directions (shift states) of the propulsion forces of the outboard motors 3*a* and 3*b* so as to reduce the deviation amount G in the target orientation Td based on the target speed and the actual speed transmitted from the GPS device 6. For example, the deviation amount G is reduced to substantially zero. Specifically, the controller 52 is configured or programmed to control the magnitudes and directions of the propulsion forces of the outboard motors 3*a* and 3*b* so as to reduce the deviation amount G to substantially hold the boat 1 at the target position Tp in the target orientation Td based on target propulsion forces F1 and F2 according to a difference between the target speed of the boat 1 set based on the deviation amount G and the actual speed of the boat 1. This control is performed every predetermined control period. Note that even when the difference between the target speed and the actual speed (target speed-actual speed) is zero, the deviation amount G is not always zero.

Figure 12:
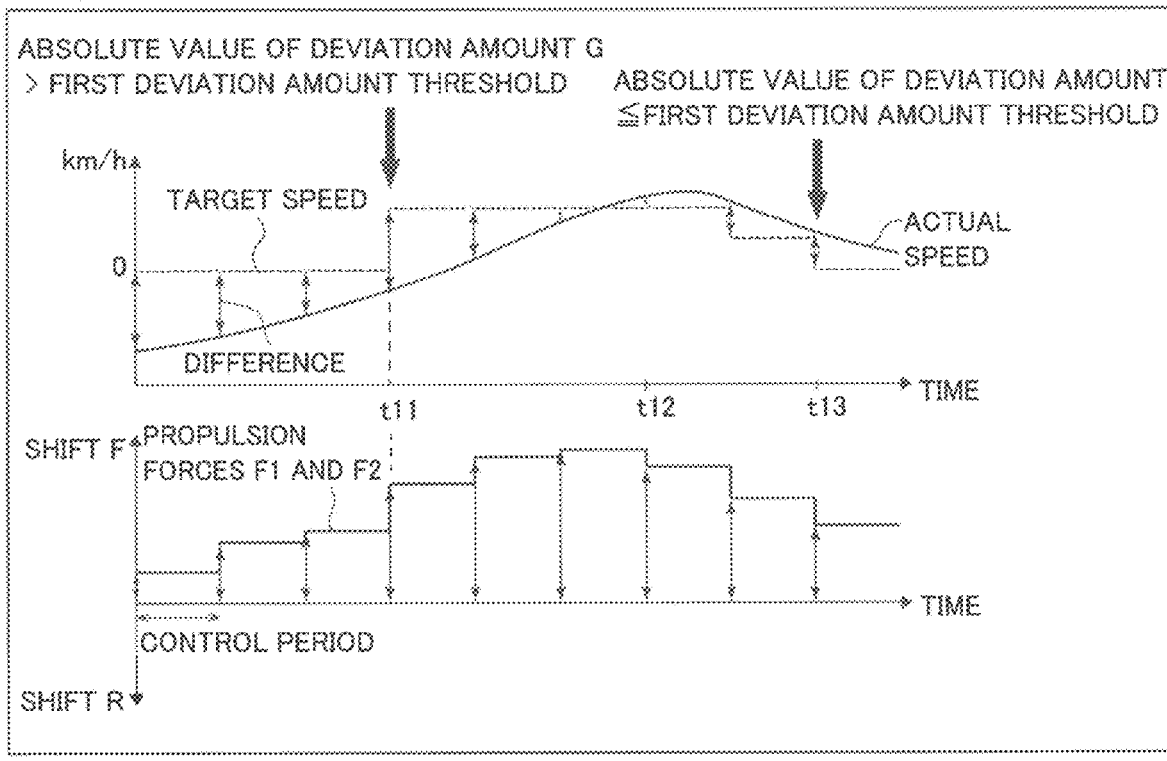
FIG. 12 is a diagram illustrating relationships between a target speed, an actual speed, and propulsion forces according to a preferred embodiment of the present invention.

An example of a control by the controller 52 to reduce the deviation amount G is now described with reference to FIG. 12. First, until the absolute value of the deviation amount G exceeds the first deviation amount threshold (until a time t11), the target speed based on the deviation amount G is set to zero. The actual speed is negative (−), and thus the shift states of the outboard motors 3*a* and 3*b* are both set to the forward movement state (shift F) such that the actual speed is canceled, and the propulsion forces F1 and F2 in the forward movement direction (FWD) are generated. The negative actual speed is canceled by the propulsion forces F1 and F2 in the forward movement direction, and thus a difference between the target speed and the actual speed decreases, and the target speed approaches zero. In such a case, the difference between the target speed and the actual speed is positive, and thus the propulsion forces F1 and F2 in the forward movement direction increase. At this time, a control is performed such that as the absolute value of the difference between the target speed and the actual speed increases, the amount of increase in the propulsion forces F1 and F2 in the forward movement direction increases.

When the absolute value of the deviation amount G exceeds the first deviation amount threshold at the time t11, the target speed is newly set according to the deviation amount G, and the amount of increase in the propulsion forces F1 and F2 in the forward movement direction is determined according to a difference between the newly set target speed and the actual speed. FIG. 12 illustrates a case in which the target speed is newly set to a positive value according to the deviation amount G.

When the difference between the target speed and the actual speed becomes negative at a time t12, the propulsion forces F1 and F2 in the forward movement direction decrease. At this time, as the absolute value of the difference between the target speed and the actual speed increases, the amount of decrease in the propulsion forces F1 and F2 in the forward movement direction increases. Thus, the magnitudes of the propulsion forces F1 and F2 in the forward movement direction are increased or decreased in a stepwise fashion based on the difference between the target speed and the actual speed such that the speed of the boat 1 is adjusted.

When the absolute value of the deviation amount G becomes equal to or smaller than the first deviation amount threshold at a time t13, the target speed is newly set according to the deviation amount G, and the amount of increase in the propulsion forces F1 and F2 in the forward movement direction are determined according to a difference between the newly set target speed and the actual speed. FIG. 12 illustrates a case in which the target speed is newly set to zero according to the deviation amount G. In this manner, the controller 52 controls the magnitudes and the directions of the propulsion forces of the outboard motors 3a and 3b so as to reduce the deviation amount G in consideration of the actual speed, and the boat 1 is substantially held at the target position Tp.

Note that the propulsion forces of the outboard motors 3a and 3b are not always in directions in which the actual speed is canceled. For example, even when the actual speed is zero, the controller 52 may control the outboard motors 3a and 3b such that the directions of the propulsion forces are opposite to the flow of waves, for example, when the flow is generated. In addition, the magnitude of the propulsion force F1 and the magnitude of the propulsion force F2 are not always equal to each other. That is, when a deviation angle α described below is not 0, the magnitude of the propulsion force F1 and the magnitude of the propulsion force F2 are set to be different from each other so as to reduce the deviation angle α.

The controller 52 adjusts the engine speed, the throttle opening, etc. via the ECU 33 and performs an intermittent control (pattern shift) to control the magnitude of the propulsion force F1 of the outboard motor 3a and the magnitude of the propulsion force F2 of the outboard motor 3b. Note that the intermittent control refers to a control to alternately switch the shift states between a shift-in state (the forward movement state or the reverse movement state) and the neutral state, and the controller 52 is able to more finely control the magnitude of the propulsion force F1 of the outboard motor 3a and the magnitude of the propulsion force F2 of the outboard motor 3b by adjusting a ratio of a shift-in state period to a neutral state period. The controller 52 controls the direction of the propulsion force F1 of the outboard motor 3a and the direction of the propulsion force F2 of the outboard motor 3b by switching the shift states to the forward movement state or the reverse movement state.

Structure of Control to Reduce Deviation Angle

Figure 13:
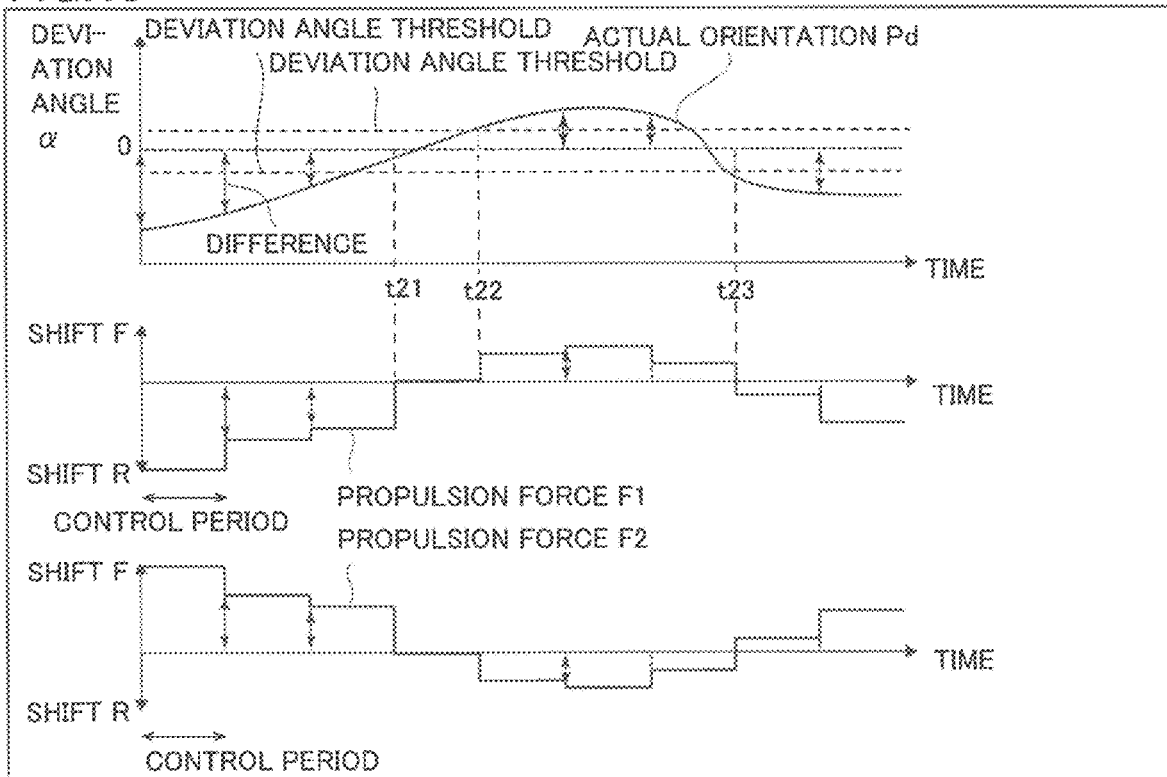
FIG. 13 is a diagram illustrating a relationship between a deviation angle and a propulsion force according to a preferred embodiment of the present invention.

As shown in FIG. 13, the controller 52 acquires the deviation angle α between the target orientation Td and the actual orientation Pd, and controls driving of the outboard motors 3a and 3b so as to reduce the deviation angle α. For example, the deviation angle α is reduced to substantially zero.

Specifically, the controller 52 is configured or programmed to acquire an angle between the target orientation Td and the actual orientation Pd as the deviation angle α based on the actual orientation Pd and the target orientation Td acquired from the electronic compass 7 (see FIG. 2). When the boat 1 is deviated clockwise with respect to the target orientation Td, the deviation angle α is set to a positive value (+), and when the boat 1 is deviated counterclockwise with respect to the target orientation Td, the deviation angle α is set to a negative value (−).

When the absolute value of the deviation angle α is equal to or larger than a deviation angle threshold, the controller 52 controls the propulsion force F1 and the shift state of the outboard motor 3a and the propulsion force F2 and the shift state of the outboard motor 3b so as to correct and reduce the deviation angle α such that the boat 1 is substantially held at the target orientation Td1. Specifically, when the deviation angle α is a negative value, the controller 52 controls the propulsion force F1 and the shift state of the outboard motor 3a and the propulsion force F2 and the shift state of the outboard motor 3b so as to turn the boat 1 right. When the deviation angle α is a positive value, the controller 52 controls the propulsion force F1 and the shift state of the outboard motor 3a and the propulsion force F2 and the shift state of the outboard motor 3b so as to turn the boat 1 left. The deviation angle threshold is about 10 degrees, for example.

An example of a control by the controller 52 to reduce the deviation angle α is now described with reference to FIG. 13. First, at a time before a time t21, the deviation angle α is a negative value, and the absolute value of the deviation angle α is equal to or larger than the deviation angle threshold value. Therefore, the controller 52 controls the boat 1 to turn right. For example, the controller 52 switches the shift state of the outboard motor 3a to the reverse movement state, and switches the shift state of the outboard motor 3b to the forward movement state. The controller 52 increases the propulsion force F1 of the outboard motor 3a and the propulsion force F2 of the outboard motor 3b as the absolute value of the deviation angle α increases.

At the time t21, the controller 52 switches the shift states of the outboard motors 3a and 3b to the neutral state in response to the deviation angle α being smaller than the deviation angle threshold. At a time t22, the controller 52 controls the boat 1 to turn left in response to the deviation angle α being a positive value and the absolute value of the deviation angle α being equal to or larger than the deviation angle threshold. For example, the controller 52 switches the shift state of the outboard motor 3a to the forward movement state, and switches the shift state of the outboard motor 3b to the reverse movement state. The controller 52 increases the propulsion force F1 of the outboard motor 3a and the propulsion force F2 of the outboard motor 3b as the absolute value of the deviation angle α increases.

Boat Maneuvering Control Method Using Boat Maneuvering Control System

A control process of the boat maneuvering control system 100 according to preferred embodiments of the present invention is now described. This control process is performed by the controller 52. Furthermore, a target position setting and updating control process S100 (see FIG. 14) and a control S200 (see FIG. 15) to reduce the deviation amount and the deviation angle are repeatedly performed.

Figure 14:
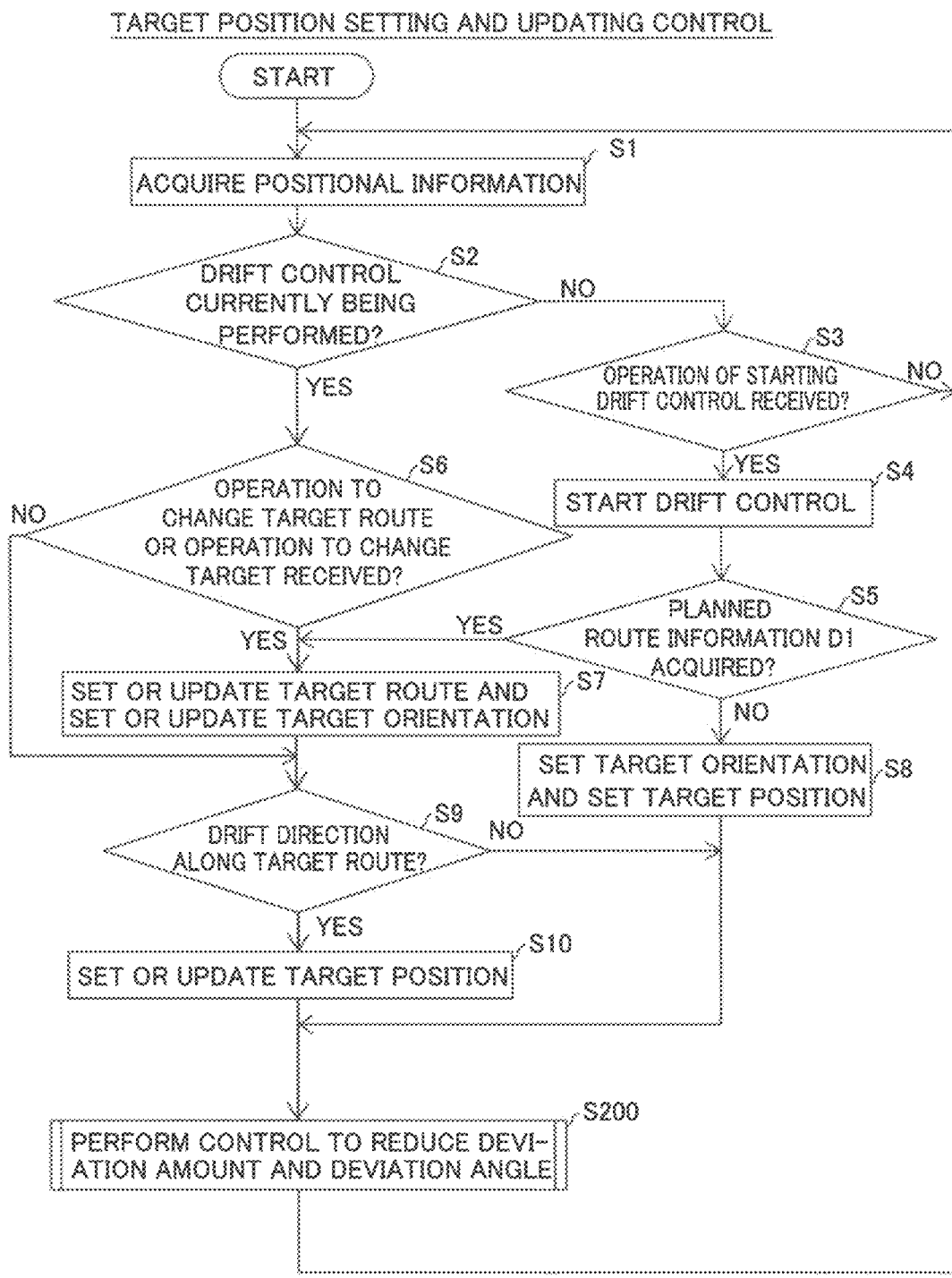
FIG. 14 is a flowchart showing a control process of setting and updating a target position of a boat maneuvering control system according to a preferred embodiment of the present invention.

The target position setting and updating control S100 is described with reference to FIG. 14. First, in step S1, the positional information D3 indicating the actual position (current position Pp) of the boat 1 is acquired. Thereafter, the process advances to step S2.

In step S2, it is determined whether or not the drift control is currently being performed. When the drift control is currently being performed, the process advances to step S6. When the drift control is not currently being performed, the process advances to step S3.

In step S3, it is determined whether or not an operation of starting the drift control has been received. That is, it is determined whether or not the user has performed an input operation on the drift control start operator 51d. When the operation of starting the drift control has not been received, the process returns to step S1. When the operation of starting the drift control has been received, the process advances to step S4.

In step S4, the drift control is started. Thereafter, the process advances to step S5.

In step S5, it is determined whether or not the planned route information D1 has been acquired from the cruise information display 10. When the planned route information D1 has been acquired, the process advances to step S7. When the planned route information D1 has not been acquired, the process advances to step S8.

In step S6 to which the process advances when the drift control is being performed, it is determined whether or not an operation to change the target route R2 or an operation to change the target orientation Td has been received. That is, it is determined whether or not an operation on the joystick 51c has been received. When the operation to change the target route R2 or the operation to change the target orientation Td has been received (acquired), the process advances to step S7. When neither the operation to change the target route R2 nor the operation to change the target orientation Td has been received (acquired), the process advances to step S9.

In step S7, the target route R2 is set or updated, and the target orientation is set or updated. That is, when the process advances from step S5 to step S7, the target route R2 is set at the position that matches the planned route R1 based on the planned route information D1. The target orientation Td is set to the direction that intersects with the target route R2. For example, the actual (current) orientation of the boat 1 is set as the target orientation Td. With this setting, the target route R2 has a non-linear shape when the planned route R1 has a non-linear shape. In addition, the target route R2 has a non-linear shape when the planned route R1 is shaped to follow the shape of the shore.

When the process advances from step S6 to step S7, the target route R2 or the target orientation Td is changed based on the operation to change the target route R2 or the operation to change the target orientation Td. That is, when a signal of the operation to change the target route R2 is the forward movement signal S1, the target route R2 is deviated (offset) in the forward movement direction along the target orientation Td. When the signal of the operation to change the target route R2 is the reverse movement signal S2, the target route R2 is deviated (offset) in the reverse movement direction along the target orientation Td. When a signal of the operation to change the target orientation Td is the right turn signal S5, the target orientation Td is changed to a clockwise direction. When the signal of the operation to change the target orientation Td is the left turn signal S6, the target orientation Td is changed to a counterclockwise direction.

In step S8 to which the process advances when the planned route information D1 has not been acquired, the actual (current) position of the boat 1 is set at the target position Tp, and the actual (current) orientation of the boat 1 is set to the target orientation Td1 based on the positional information D3. Thereafter, a control to reduce the deviation amount G and the deviation angle α in step S200 (see FIG. 11) is performed.

In step S9, the drifting direction of the boat 1 is acquired based on the positional information D3, and it is determined whether or not the drifting direction is along the target route R2. That is, it is determined whether or not the boat 1 is able to drift along the target route R2. When the drifting direction is along the target route R2, the process advances to step S10, and when the drifting direction is not along the target route R2, the process advances to step S8, and a control to hold the boat 1 at the current position Pp is performed. In step S9, when the target position Tp is set not based on the target route information D2 (when the planned route information D1 has not been acquired), the process advances to step S200 (see FIG. 15).

In step S10, the target position Tp is set or updated. That is, the target position Tp is set or updated based on the target route information D2 and the positional information D3. Specifically, an intersection of a line along the target orientation Td from the newly acquired positional information D3 (coordinate position) and the target route R2 is set as a new target position Tp. The coordinate position is acquired based on the information D4 about the route length through which the boat 1 has drifted, which has been acquired based on the positional information D3, for example. Thus, the target position Tp is set on the target route R2 of the target route information D2 every time the positional information D3 (the information about the current position Pp) is acquired. That is, the target position Tp is updated along the target route R2 according to the drifting of the boat 1.

Figure 15:
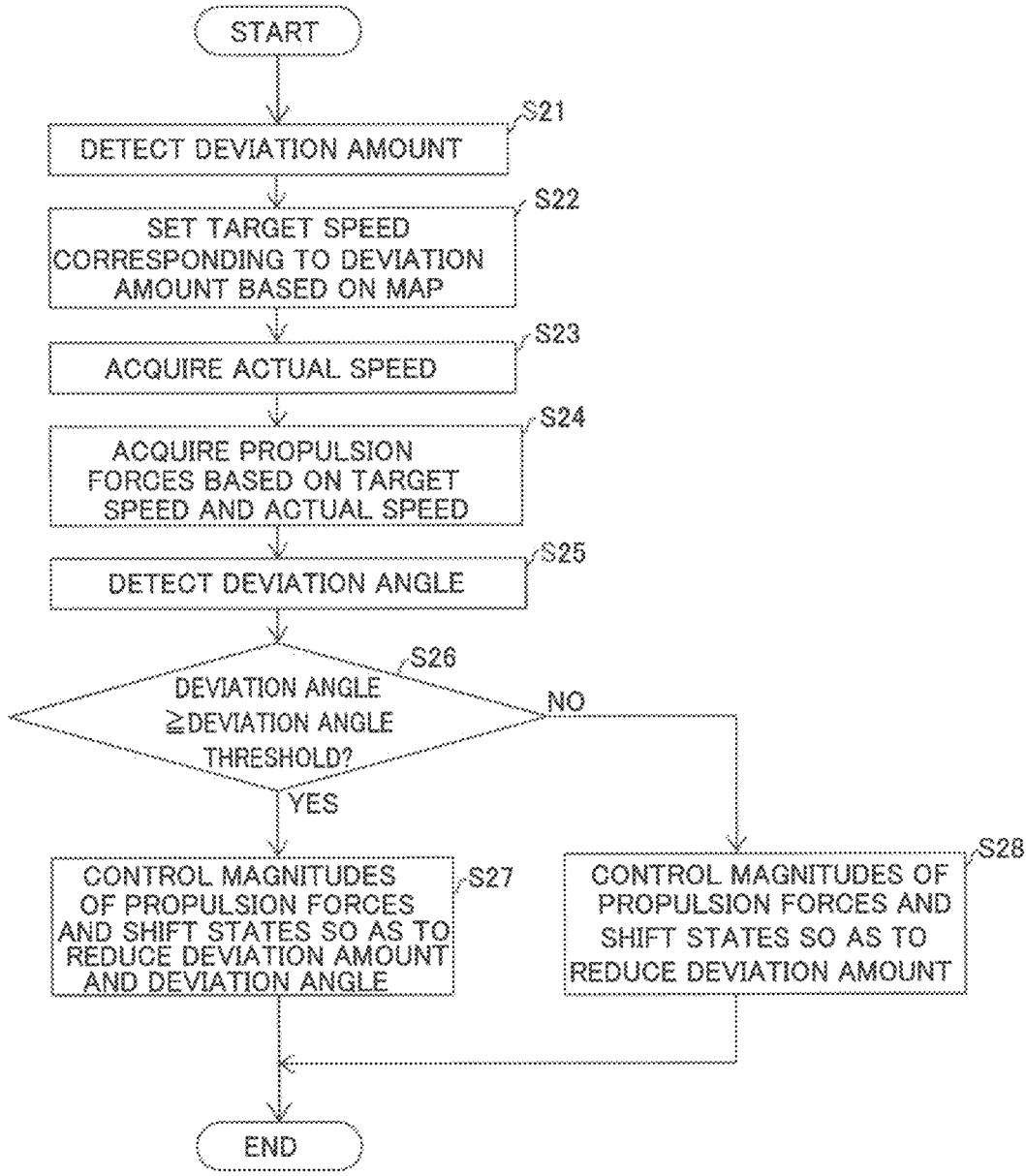
FIG. 15 is a flowchart showing a control process of reducing the deviation amount and the deviation angle of a boat maneuvering control system according to a preferred embodiment of the present invention.

The control S200 to reduce the deviation amount and the deviation angle is now described with reference to FIG. 15. First, in step S21, the distance between the target position Tp and the boat 1 (current position Pp) is acquired as the deviation amount G. Thereafter, the process advances to step S22.

In step S22, a target speed corresponding to the deviation amount G is set based on the map 53a. Then, in step S23, the actual speed is acquired. Thereafter, in step S24, the magnitudes of the target propulsion forces F1 and F2 of the outboard motors 3a and 3b and the shift states of the outboard motors 3a and 3b are acquired based on the target speed and the actual speed. For example, the magnitudes of the target propulsion forces F1 and F2 of the outboard motors 3a and 3b and the shift states of the outboard motors 3a and 3b are acquired, based on the difference between the target speed and the actual speed, to reduce the deviation amount G in the target orientation Td such that the boat 1 is substantially held at the target position Tp in the target orientation Td. Thereafter, the process advances to step S25.

In step S25, the deviation angle α is detected. Thereafter, in step S26, it is determined whether or not the deviation angle α is equal to or larger than the deviation angle threshold. When the deviation angle α is equal to or larger than the deviation angle threshold, in step S27, the outboard motors 3a and 3b are controlled such that the magnitudes of the propulsion forces F1 and F2 and the shift states are changed to reduce the deviation amount G and the deviation angle α. For example, the outboard motors 3a and 3b are controlled based on the magnitudes of the target propulsion forces F1 and F2 of the outboard motors 3a and 3b and the shift states of the outboard motors 3*a* and 3*b* acquired in step S24, and the magnitudes of the propulsion forces F1 and F2 and the shift states to reduce the deviation angle α shown in FIG. 13. When the deviation angle α is smaller than the deviation angle threshold, in step S28, the magnitudes of the propulsion forces F1 and F2 and the shift states are controlled so as to reduce the deviation amount G. That is, the outboard motors 3*a* and 3*b* are controlled such that the magnitudes of the target propulsion forces F1 and F2 of the outboard motors 3*a* and 3*b* and the shift states of the outboard motors 3*a* and 3*b* become those acquired in step S24. After these, the process returns to the target position setting and updating control S100 (see FIG. 8).

The target position setting and updating control S100 and the control S200 to reduce the deviation amount and the deviation angle are repeatedly performed such that the boat 1 drifts on the target route R2, and the user is able to troll.

Advantageous Effects of Preferred Embodiments

According to the various preferred embodiments of the present invention described above, the following advantageous effects are achieved.

According to a preferred embodiment of the present invention, as described above, the target position Tp is set based on the target route information D2 and the positional information D3. Accordingly, even when the target route R2 is a route that is not linear and is shaped to follow the shape of the shore or the shape of a water area, for example, the target position Tp is automatically set based on the target route information D2 and the positional information D3 so as to correspond to the target route R2. Consequently, even when the boat 1 drifts along a desired route (target route R2) that is not linear, the number of times the user resets the target position Tp is reduced. Thus, the convenience of boat maneuvering for the user who is trolling is improved.

According to a preferred embodiment of the present invention, as described above, setting the target position Tp includes setting the target position Tp on the target route R2 of the target route information D2. Accordingly, the deviation amount G between the target position Tp on the target route R2 and the current position Pp of the boat 1 is reduced, and thus the boat 1 drifts not along a linear shape but along the target route R2. Consequently, the boat 1 drifts along a route (target route R2) desired by the user.

According to a preferred embodiment of the present invention, as described above, setting the target position Tp includes setting the target position Tp on the target route R2 in the direction along the target orientation Td from the current position Pp. Accordingly, unlike a case in which the target position Tp is set from arbitrary positions (a plurality of positions) on the target route R2, the target position Tp is easily set from a position (one position) on the target route R2 in the direction along the target orientation Td from the current position Pp.

According to a preferred embodiment of the present invention, as described above, the target route information D2 includes target route information D2 about the target route R2 having a non-linear shape. Furthermore, acquiring the current position Pp includes repeatedly acquiring the positional information D3. In addition, setting the target position Tp includes updating the target position Tp on the target route R2 every time the positional information D3 is acquired. Accordingly, the target position Tp is updated on the non-linear target route R2 as needed, and thus deviation of the target position Tp from the non-linear target route R2 is significantly reduced or prevented. Consequently, the boat 1 more accurately drifts along the target route R2.

According to a preferred embodiment of the present invention, as described above, the target route information D2 includes target route information D2 about the target route R2 shaped to follow the shape of the shore. Furthermore, setting the target position Tp includes updating the target position Tp on the target route R2 every time the positional information D3 is acquired. Accordingly, even when the user trolls along a shore having a relatively complex shape, the boat 1 drifts along the shore without frequent resetting of the target position Tp.

According to a preferred embodiment of the present invention, as described above, setting the target position Tp includes setting the target position Tp based on the target route information D2 and the information D4 about the route length, through which the boat 1 has drifted, based on the positional information D3. Accordingly, the target position Tp is set based on the information D4 about the route length through which the boat 1 has drifted, and thus the target position Tp is set at an appropriate position along the course of the boat 1 drifting along the target route R2, for example.

According to a preferred embodiment of the present invention, as described above, a target orientation Td is further set as the target orientation Td, the information about the actual orientation Pd of the boat 1 is further acquired, the deviation angle α of the actual orientation Pd with respect to the target orientation Td is acquired, and a control to bring the actual orientation Pd closer to the target orientation Td is further performed by controlling driving of the outboard motors 3*a* and 3*b* so as to reduce the deviation angle α. Accordingly, even when the orientation of the boat 1 changes, the orientation of the boat 1 is substantially held such that the boat 1 faces the target orientation Td (desired orientation).

According to a preferred embodiment of the present invention, as described above, setting the target orientation Td includes changing the target orientation Td based on an operation to change the target orientation Td. Accordingly, even when the orientation desired by the user changes, the target orientation Td is changed. For example, when the direction of the wind changes, the target orientation Td is changed.

According to a preferred embodiment of the present invention, as described above, the target route information D2 includes the planned route information D1, and setting the target position Tp includes setting the target route R2 at the position that matches the planned route R1 or setting the target route R2 at the position deviated in the target orientation Td from the planned route R1. Accordingly, when the planned route R1 is set (when a route on which the boat 1 drifts is set in advance), the planned route R1 is set as the target route R2. Furthermore, when the planned route R1 is set and the user desires to set the target route R2 at the position deviated in the target orientation Td from the planned route R1, the target route R2 is set at the position deviated in the target orientation Td from the planned route R1 in response to the user's request.

According to a preferred embodiment of the present invention, as described above, an operation to change the target route R2 is further received. Furthermore, setting the target position Tp includes setting the target route R2 at a position deviated in the target orientation Td from the planned route R1 based on the operation to change the target route R2. Accordingly, when the user desires to change (offset) the target route R2 in the target orientation Td, the user changes the target route R2 by performing the operation to change the target route R2.

According to a preferred embodiment of the present invention, as described above, the operation signal S7 to start control of the magnitudes of the propulsion forces F1 and F2 of the outboard motors 3a and 3b so as to reduce the deviation amount G is further received. Furthermore, setting the target position Tp includes setting the target position Tp based on the target route information D2 and the current position Pp when the target route information D2 has been acquired when the start operation signal S7 is received, and setting the current position Pp of the boat 1 at the target position Tp when the target route information D2 has not been acquired when the start operation signal S7 is received. Accordingly, when the user desires to troll along the target route R2 and has acquired the target route information D2, the boat 1 drifts along the target route R2, and when the user desires to hold the boat 1 at the target position Tp in the target orientation Td, the boat 1 is held at the current position Pp of the boat 1 in the target orientation Td.

According to a preferred embodiment of the present invention, as described above, the information about the direction in which the boat 1 drifts is further acquired, and setting the target position Tp includes setting the target position Tp based on the target route information D2 and the positional information D3 when the target route information D2 has been acquired and the target route R2 is along the direction in which the boat 1 drifts when the start operation signal S7 is received. Accordingly, the target position Tp is set in an appropriate case in which the boat 1 drifts along the target route R2. That is, when the target route R2 is suitable for the boat 1 to drift, a control to allow the boat 1 to drift along the target route R2 is effectively performed.

According to a preferred embodiment of the present invention, as described above, the target speed is further set according to the deviation amount G, the information about the actual speed of the boat 1 is acquired, and controlling the magnitudes of the propulsion forces F1 and F2 includes controlling the magnitudes of the propulsion forces F1 and F2 based on the target speed and the information about the actual speed so as to reduce the deviation amount G. Accordingly, the controlling is based on the target speed and the information about the actual speed, and thus the magnitudes of the propulsion forces F1 and F2 are easily controlled such that the deviation amount G is reduced.

According to a preferred embodiment of the present invention, as described above, the outboard motors 3a and 3b are provided on the boat 1. Furthermore, the controller 52 is configured or programmed to control the magnitudes of the propulsion forces F1 and F2 of the plurality of outboard motors 3a and 3b so as to reduce the deviation amount G. Accordingly, even when a plurality of outboard motors (outboard motors 3a and 3b) are provided on the boat 1, the magnitudes of the propulsion forces F1 and F2 of the outboard motors 3a and 3b are controlled such that the deviation amount G is reduced.

Modified Examples

The preferred embodiments of the present invention described above are illustrative in all points and not restrictive. The extent of the present invention is not defined by the above description of the preferred embodiments but by the scope of the claims, and all modifications (modified examples) within the meaning and range equivalent to the scope of the claims are further included.

For example, while the example in which two outboard motors (outboard motors 3a and 3b) are provided on the boat 1 (boat maneuvering control system 100) has been shown in preferred embodiments described above, the present invention is not restricted to this. For example, only one outboard motor 203 may be provided as in a boat 201 (boat maneuvering control system 200) according to a modified example shown in FIGS. 16 and 17.

While the example in which the shift state of the outboard motor 3a and the shift state of the outboard motor 3b are different from each other in order to reduce the deviation angle α has been shown in preferred embodiments described above, the present invention is not restricted to this. As in the boat 201 (boat maneuvering control system 200) according to the modified example shown in FIGS. 16 and 17, the deviation angle α may be reduced by controlling the steering angle θ of the outboard motor 203.

Figure 16:
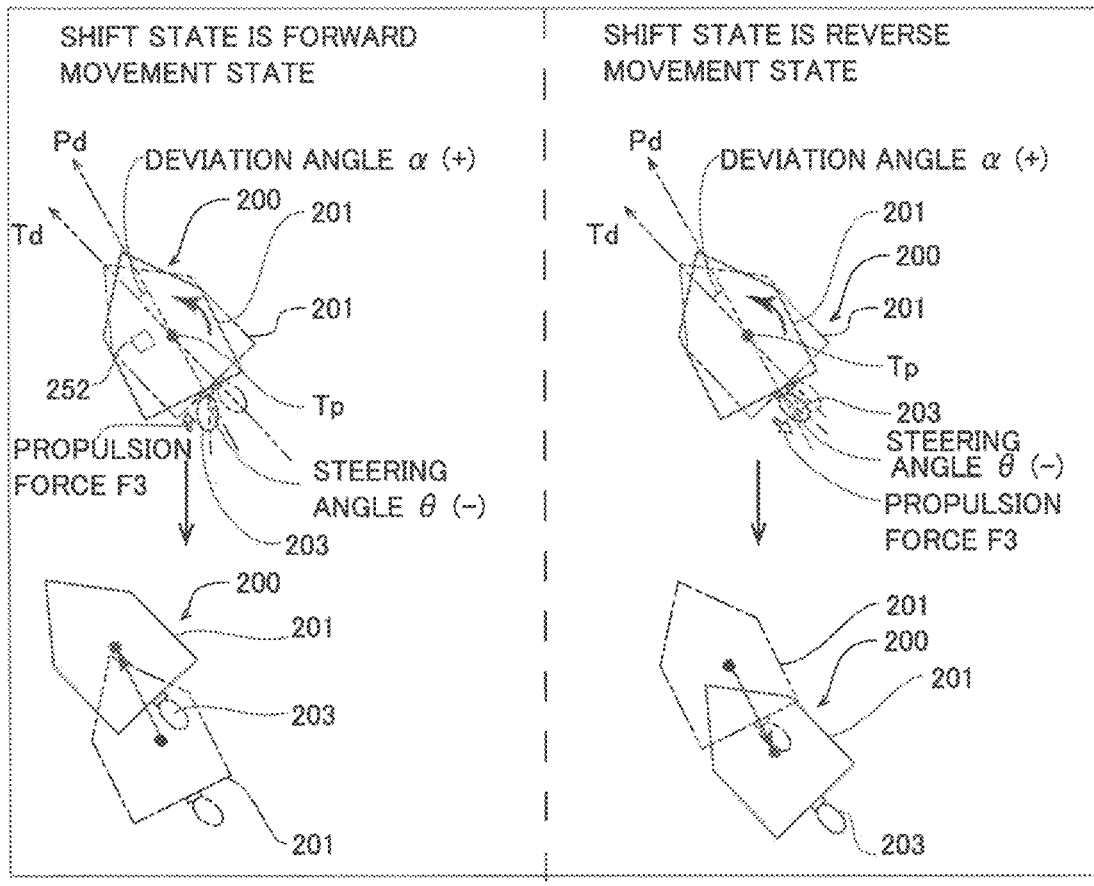
FIG. 16 is a diagram illustrating a control to reduce the deviation angle (+) of a boat maneuvering control system according to a modified example of a preferred embodiment of the present invention.
Figure 17:
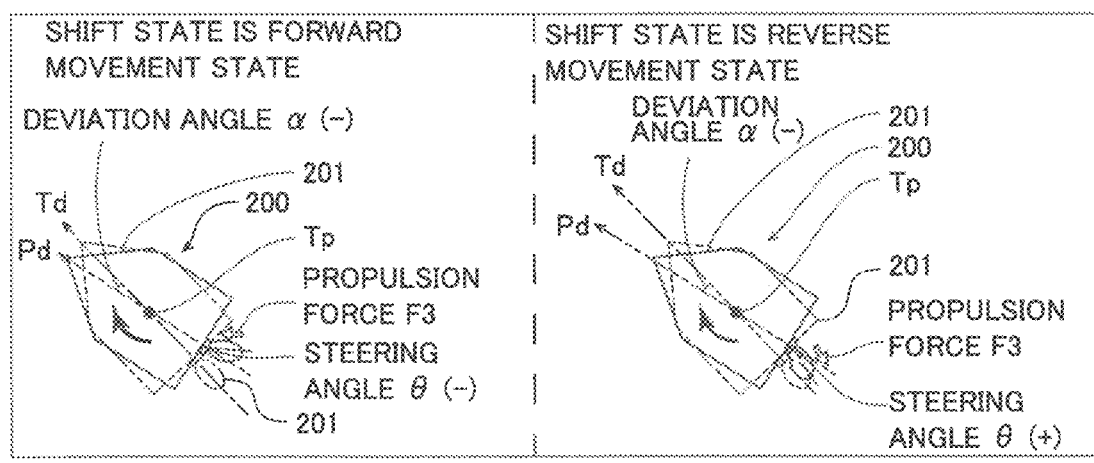
FIG. 17 is a diagram illustrating a control to reduce the deviation angle (−) of a boat maneuvering control system according to a modified example of a preferred embodiment of the present invention.

A controller 252 of the boat maneuvering control system 200 according to the modified example shown in FIGS. 16 and 17 is configured or programmed to control the steering angle θ of the outboard motor 203 so as to reduce the deviation angle α when the absolute value of the deviation angle α is equal to or larger than a deviation angle threshold. At this time, the controller 252 controls the steering angle θ of the outboard motor 203 based on the shift state of the outboard motor 203.

Specifically, when the deviation angle α is a positive value and the shift state is a forward movement state, the controller 252 controls a steering 208 such that the steering angle θ of the outboard motor 203 is a positive value and is as large as possible. A predetermined propulsion force F3 is generated in the outboard motor 203 such that a force that causes the boat 201 to rotate counterclockwise about the center of gravity of the boat 201 is generated. Consequently, the boat 201 is rotated so as to be closer to a target orientation Td. The steering angle θ is as large as possible such that the turning radius of the boat 201 is reduced, and thus generation of a large deviation amount G due to correction of the deviation angle α is significantly reduced or prevented.

When the deviation angle α is a positive value and the shift state is a reverse movement state, the controller 252 controls the steering 208 such that the steering angle θ of the outboard motor 203 is a negative value and is as large as possible. A predetermined propulsion force F3 is generated in the outboard motor 203 such that a force that causes the boat 201 to rotate counterclockwise about the center of gravity of the boat 201 is generated, similarly to a case in which the shift state is the forward movement state. Consequently, the boat 201 is rotated so as to be closer to the target orientation Td.

As shown in FIG. 17, when the deviation angle α is a negative value and the shift state is the forward movement state, the controller 252 performs a control such that the steering angle θ of the outboard motor 203 is a negative value, and when the deviation angle α is a negative value and the shift state is the reverse movement state, the controller 252 performs a control such that the steering angle θ of the outboard motor 203 is a positive value. Thus, a force that causes the boat 1 to rotate clockwise about the center of gravity of the boat 1 is generated, and the boat 1 is rotated so as to be closer to the target orientation Td.

While the example in which the outboard motors attached to the outside of the hull are used as propulsion devices has been shown in preferred embodiments described above, the present invention is not restricted to this. As propulsion devices, inboard motors attached to the inside of the hull or inboard-outboard motors (stern drives) provided inside and outside the hull may be used.

While the example in which the controller is provided on the boat maneuvering device has been shown in preferred embodiments described above, the present invention is not restricted to this. For example, the controller may be provided in the propulsion device or in the cruise information display.

While the example in which during the drift control, the controller controls not only the deviation amount but also the deviation angle has been shown in preferred embodiments described above, the present invention is not restricted to this. That is, during the drift control, the controller may not control the deviation angle but may control only the deviation amount.

While the example in which the controller is configured or programmed to acquire and set the target speed corresponding to the deviation amount based on the map has been shown in preferred embodiments described above, the present invention is not restricted to this. For example, the controller may be configured or programmed to calculate the target speed corresponding to the deviation amount without using the map.

While the example in which the predetermined direction that is a reference for the deviation amount and the target position is the forward-rearward direction of the boat at the time of receiving a setting of the target position has been shown in preferred embodiments described above, the present invention is not restricted to this. For example, the predetermined direction may be a direction other than the forward-rearward direction of the boat at the time of receiving a setting of the target position, such as the right-left direction of the boat at the time of receiving a setting of the target position or a predetermined oblique direction.

While the example in which the actual speed of the boat is detected by the GPS device has been shown in preferred embodiments described above, the present invention is not restricted to this. For example, the actual speed of the boat may be detected from a difference between the static pressure and the dynamic pressure using a pitot tube, or the actual speed of the boat may be detected from the rotation speed of a water turbine using a water turbine device.

While the example in which the joystick receives an operation to change the target route and an operation to change the target orientation has been shown in preferred embodiments described above, the present invention is not restricted to this. For example, the steering wheel or the remote controls may receive an operation to change the target route R2 and an operation to change the target orientation Td.

While the example in which the target position is set on the target route has been shown in preferred embodiments described above, the present invention is not restricted to this. For example, the target position may be set at a position deviated by a predetermined distance from the target route.

While the example in which the target position is set on the target route in the direction along the target orientation from the current position has been shown in preferred embodiments described above, the present invention is not restricted to this. For example, the target position may be set on the target route in the current orientation from the current position.

While the example in which the target route is non-linear and is shaped to follow the shape of the shore has been shown in preferred embodiments described above, the present invention is not restricted to this. For example, the target route may be linear.

While the example in which every time the positional information is acquired, the target position is updated on the target route has been shown in preferred embodiments described above, the present invention is not restricted to this. For example, the target position may be updated on the target route every time a predetermined period of time elapses.

While the example in which the target position is set based on the target route information and the route length, through which the boat has drifted, based on the positional information has been shown in preferred embodiments described above, the present invention is not restricted to this. For example, the target position may be set based on the current position and the target route information without using the information about the route length through which the boat has drifted.

While the example in which the controller is configured or programmed to acquire the planned route information from the cruise information display has been shown in preferred embodiments described above, the present invention is not restricted to this. For example, the controller may be configured or programmed to generate the target route information (target route) without using the planned route information.

While the example in which the drift control is started when an operation of starting the drift control is received has been shown in preferred embodiments described above, the present invention is not restricted to this. For example, in response to the controller acquiring the planned route information from the cruise information display, the target route and the target orientation may be set, and the drift control may be automatically started.

While the example in which the target position is set based on the target route information and the positional information when the target route is along the direction in which the boat drifts has been shown in preferred embodiments described above, the present invention is not restricted to this. For example, the target position may be set without acquiring the direction in which the boat drifts (regardless of whether or not the target route is along the direction in which the boat drifts).

While the process operations performed by the controller are described using flowcharts in a flow-driven manner in which processes are performed in order along a process flow for the convenience of illustration in preferred embodiments described above, the present invention is not restricted to this. In the present invention, the process operations performed by the controller may be performed in an event-driven manner in which the processes are performed on an event basis. In this case, the process operations performed by the controller may be performed in a complete event-driven manner or in a combination of an event-driven manner and a flow-driven manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A boat maneuvering control method for a boat including a propulsion device, the method comprising:
   acquiring target route information about a target route as a route on which the boat is to drift, and information about an actual position of the boat when a drift control is performed to control a drive of the propulsion device such that the boat drifts along the target route;
   setting a target position based on the target route information and the information about the actual position;

acquiring, as a deviation amount, a distance between the target position and the boat in a predetermined direction that intersects with the target route; and controlling a magnitude of a propulsion force of the propulsion device so as to reduce the deviation amount.

2. The boat maneuvering control method for the boat according to claim 1, wherein the setting of the target position includes setting the target position on the target route of the target route information.

3. The boat maneuvering control method for the boat according to claim 2, wherein the setting of the target position includes setting the target position on the target route in a direction along the predetermined direction from the actual position.

4. The boat maneuvering control method for the boat according to claim 2, wherein the target route information includes information about the target route having a non-linear shape;

the acquiring of the actual position includes repeatedly acquiring the information about the actual position; and the setting of the target position includes updating the target position on the target route every time the information about the actual position is acquired.

5. The boat maneuvering control method for the boat according to claim 4, wherein the target route information includes information about the target route that is shaped to follow a shape of a shore; and the setting of the target position includes updating the target position on the target route every time the information about the actual position is acquired.

6. The boat maneuvering control method for the boat according to claim 1, wherein the setting of the target position includes setting the target position based on the target route information and a route length through which the boat has drifted, and the route length is based on the information about the actual position.

7. The boat maneuvering control method for the boat according to claim 1, further comprising:

further setting a target orientation as the predetermined direction;

further acquiring information about an actual orientation of the boat;

acquiring a deviation angle of the actual orientation with respect to the target orientation; and further performing a control to bring the actual orientation closer to the target orientation by controlling driving of the propulsion device so as to reduce the deviation angle.

8. The boat maneuvering control method for the boat according to claim 7, wherein the setting of the target orientation includes changing the target orientation based on an operation to change the target orientation.

9. The boat maneuvering control method for the boat according to claim 1, wherein the target route information includes information about a planned route; and the setting of the target position includes setting the target route at a position that matches the planned route or setting the target route at a position deviated in the predetermined direction from the planned route.

10. The boat maneuvering control method for the boat according to claim 9, further comprising:

receiving an operation to change the target route; wherein the setting of the target position includes setting the target route at the position deviated in the predetermined direction from the planned route based on the operation to change the target route.

11. The boat maneuvering control method for the boat according to claim 1, further comprising:

receiving an operation to start control of the magnitude of the propulsion force of the propulsion device so as to reduce the deviation amount; wherein the setting of the target position includes setting the target position based on the target route information and the actual position when the target route information has been acquired when the operation to start control is received, and setting a current position of the boat at the target position when the target route information has not been acquired when the operation to start control is received.

12. The boat maneuvering control method for the boat according to claim 11, further comprising:

acquiring information about a direction in which the boat is drifting; wherein the setting of the target position includes setting the target position based on the target route information and the information about the actual position when the target route information has been acquired and the target route is along the direction in which the boat is drifting when the operation to start control is received.

13. The boat maneuvering control method for the boat according to claim 1, further comprising:

setting a target speed according to the deviation amount; and acquiring information about an actual speed of the boat; wherein the controlling of the magnitude of the propulsion force includes controlling the magnitude of the propulsion force based on the target speed and the information about the actual speed so as to reduce the deviation amount.

14. A boat maneuvering control system for a boat, the system comprising:

a propulsion device; and a controller configured or programmed to acquire target route information about a target route on which the boat including the propulsion device is to drift, and information about an actual position of the boat when a drift control is performed to control a drive of the propulsion device such that the boat drifts along the target route, to set a target position based on the target route information and the information about the actual position, to acquire, as a deviation amount, a distance between the target position and the boat in a predetermined direction that intersects with the target route, and to control a magnitude of a propulsion force of the propulsion device so as to reduce the deviation amount.

15. The boat maneuvering control system for a boat according to claim 14, wherein the controller is configured or programmed to set the target position based on the target route information and a route length through which the boat has drifted, and the route length is based on the information about the actual position of the boat.

16. The boat maneuvering control system for a boat according to claim 14, further comprising:

an orientation acquirer that acquires information about an actual orientation of the boat; wherein the controller is configured or programmed to set a target orientation as the predetermined direction, to acquire a deviation angle of the actual orientation with respect to the target orientation, and to perform a control to bring the actual orientation closer to the target orientation by controlling a steering angle of the propulsion device so as to reduce the deviation angle.

17. The boat maneuvering control system for a boat according to claim 16, further comprising:
   a target orientation change operator that receives an operation to change the target orientation; wherein
   the controller is configured or programmed to change the target orientation based on the operation to change the target orientation.

18. The boat maneuvering control system for a boat according to claim 14, further comprising:
   a start operator that receives an operation to start control of the magnitude of the propulsion force of the propulsion device so as to reduce the deviation amount; wherein
   the controller is configured or programmed to set the target position based on the target route information and the information about the actual position when the target route information has been acquired when the operation on the start operator is received, and to set a current position of the boat at the target position when the target route information has not been acquired when the operation on the start operator is received.

19. The boat maneuvering control system for a boat according to claim 18, wherein the controller is configured or programmed to acquire information about a direction in which the boat is drifting based on cruise information of the boat, and to set the target position based on the target route information and the actual position when the target route information has been acquired and the target route is along the direction in which the boat is drifting when the operation on the start operator is received.

20. The boat maneuvering control system for a boat according to claim 14, wherein
   the boat includes a plurality of propulsion devices; and
   the controller is configured or programmed to control the magnitude of the propulsion force of each of the plurality of propulsion devices so as to reduce the deviation amount.

21. The boat maneuvering control method for the boat according to claim 1, further comprising:
   receiving an operation to start the drift control; wherein
   the setting of the target position includes setting the target position based on the target route information and the information about the actual position during the drift control;
   the acquiring of the deviation amount includes acquiring the deviation amount in the predetermined direction that intersects with the target route during the drift control; and
   the controlling of the magnitude of the propulsion force includes controlling the magnitude of the propulsion force of the propulsion device so as to reduce the deviation amount during the drift control.

* * * * *